US012712676B2

(12) United States Patent
Shrivastava et al.

(10) Patent No.: US 12,712,676 B2
(45) Date of Patent: Aug. 18, 2026

(54) METHODS AND SYSTEMS OF HARQ RETRANSMISSION FOR NR MBS SERVICES

(71) Applicant: Samsung Electronics Co., Ltd., Suwon-si (KR)

(72) Inventors: Vinay Kumar Shrivastava, Bangalore (IN); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 18/245,862

(22) PCT Filed: Apr. 26, 2022

(86) PCT No.: PCT/KR2022/005896

§ 371 (c)(1),
(2) Date: Mar. 17, 2023

(87) PCT Pub. No.: WO2022/231249

PCT Pub. Date: Nov. 3, 2022

(65) Prior Publication Data

US 2023/0361937 A1 Nov. 9, 2023

(30) Foreign Application Priority Data

Apr. 26, 2021 (IN) ............................ 202141019163
Apr. 7, 2022 (IN) ............................ 202141019163

(51) Int. Cl.

| | |
|---|---|
| ***H04L 1/1829*** | (2023.01) |
| ***H04W 76/28*** | (2018.01) |
| ***H04W 76/40*** | (2018.01) |

(52) U.S. Cl.
CPC ........... *H04L 1/1848* (2013.01); *H04W 76/28* (2018.02); *H04W 76/40* (2018.02)

(58) Field of Classification Search
CPC ... H04L 1/1848; H04L 1/1883; H04L 1/1887; H04L 1/1896; H04L 1/1822;
(Continued)

(56) References Cited

U.S. PATENT DOCUMENTS

2015/0280880 A1 10/2015 Yang et al.
2015/0304821 A1 10/2015 Liu et al.
(Continued)

OTHER PUBLICATIONS

Supplementary European Search Report dated Jan. 24, 2024, in connection with European Patent Application No. 22769082.0, 13 pages.
Ericsson, "Scheduling enhancements for LTE-MTC and NB-Iot," 3GPP TSG-RAN WG2 #107bis, R2-1913113, Oct. 2019, 12 pages.
Intel Corporation, "MBS MAC layer and group scheduling aspects", 3GPP TSG RAN WG2 Meeting #113bis-e, Apr. 2, 2021, R2-2102839, 8 pages.
(Continued)

*Primary Examiner* — Peter Chen

(57) ABSTRACT

The disclosure relates to a 5G or 6G communication system for supporting a higher data transmission rate. Methods and systems of HARQ retransmission for NR MBS services. Embodiments herein disclose methods and systems of HARQ retransmission for NR MBS services. Embodiments herein disclose a DRX approach and HARQ transmission and retransmission for MBS packets in order to support power efficient and reliable delivery of 5G MBS services. Embodiments herein disclose a DRX approach and HARQ transmission and retransmission for MBS packets, which work for the PTM and PTP based delivery framework for NR MBS.

20 Claims, 27 Drawing Sheets

(58) Field of Classification Search
CPC .......... H04L 2001/0093; H04W 76/28; H04W 76/40; H04W 4/06; H04W 72/30
See application file for complete search history.

(56) References Cited

U.S. PATENT DOCUMENTS

| | | | | |
|---|---|---|---|---|
| 2018/0206289 | A1 | 7/2018 | Kim et al. | |
| 2019/0158229 | A1 | 5/2019 | Wei et al. | |
| 2019/0190662 | A1 | 6/2019 | Lee et al. | |
| 2022/0095313 | A1* | 3/2022 | Kim | H04L 1/1883 |
| 2023/0063082 | A1 | 3/2023 | Zhou et al. | |
| 2023/0388972 | A1* | 11/2023 | Chang | H04W 4/06 |
| 2024/0188186 | A1* | 6/2024 | Dai | H04W 4/06 |

OTHER PUBLICATIONS

International Search Report dated Jul. 25, 2022 in connection with International Patent Application No. PCT/KR2022/005896, 3 pages.
Written Opinion of the International Searching Authority dated Jul. 25, 2022 in connection with International Patent Application No. PCT/KR2022/005896, 4 pages.
Intellectual Property India, "Examination report under sections 12 & 13 of the Patents Act," dated Jan. 11, 2023, in connection with Indian Patent Application No. 202141019163, 7 pages.
Office Action dated Mar. 28, 2025, in connection with European Patent Application No. 22796082.0, 9 pages.

* cited by examiner

[Fig. 1a]
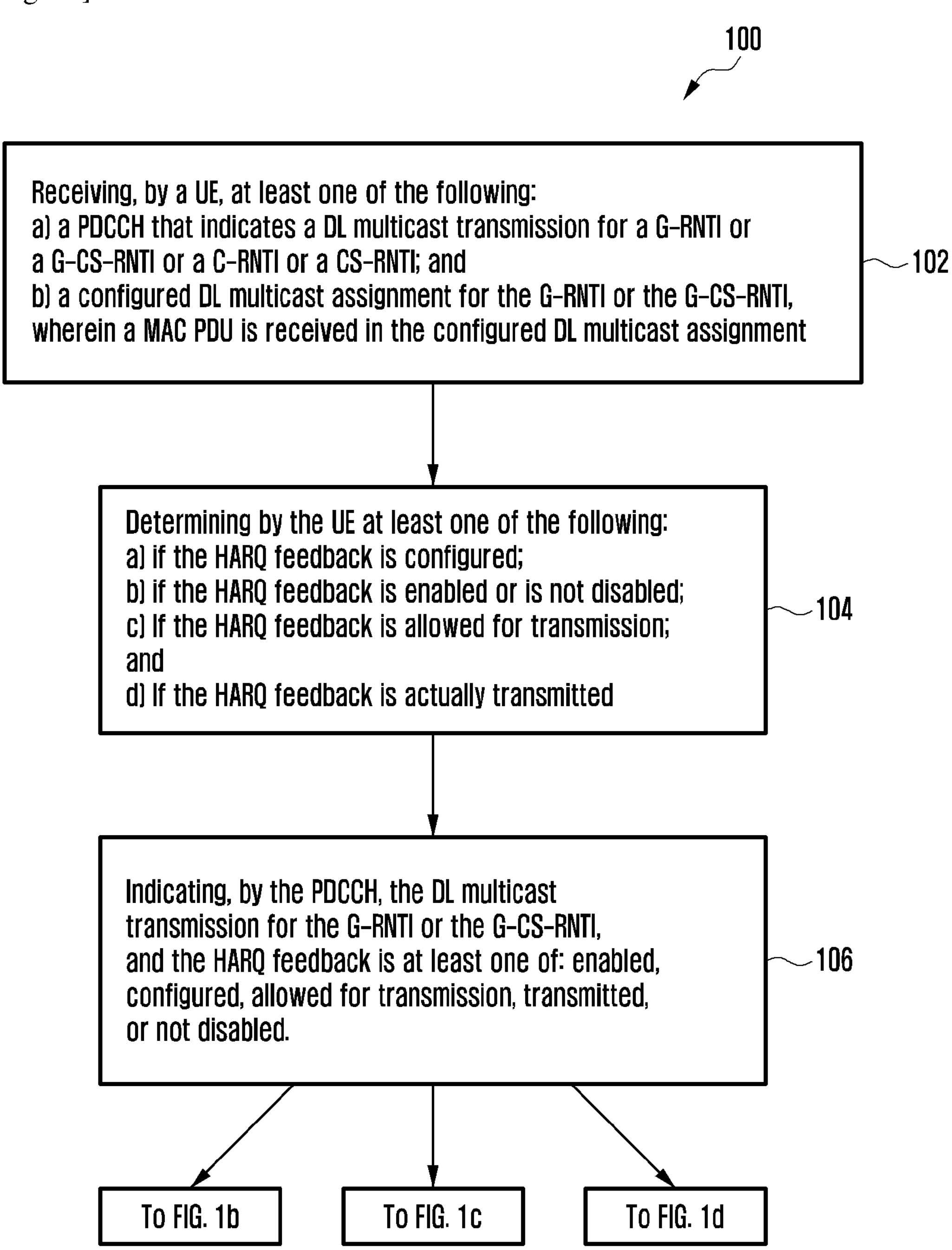

[Fig. 1b]
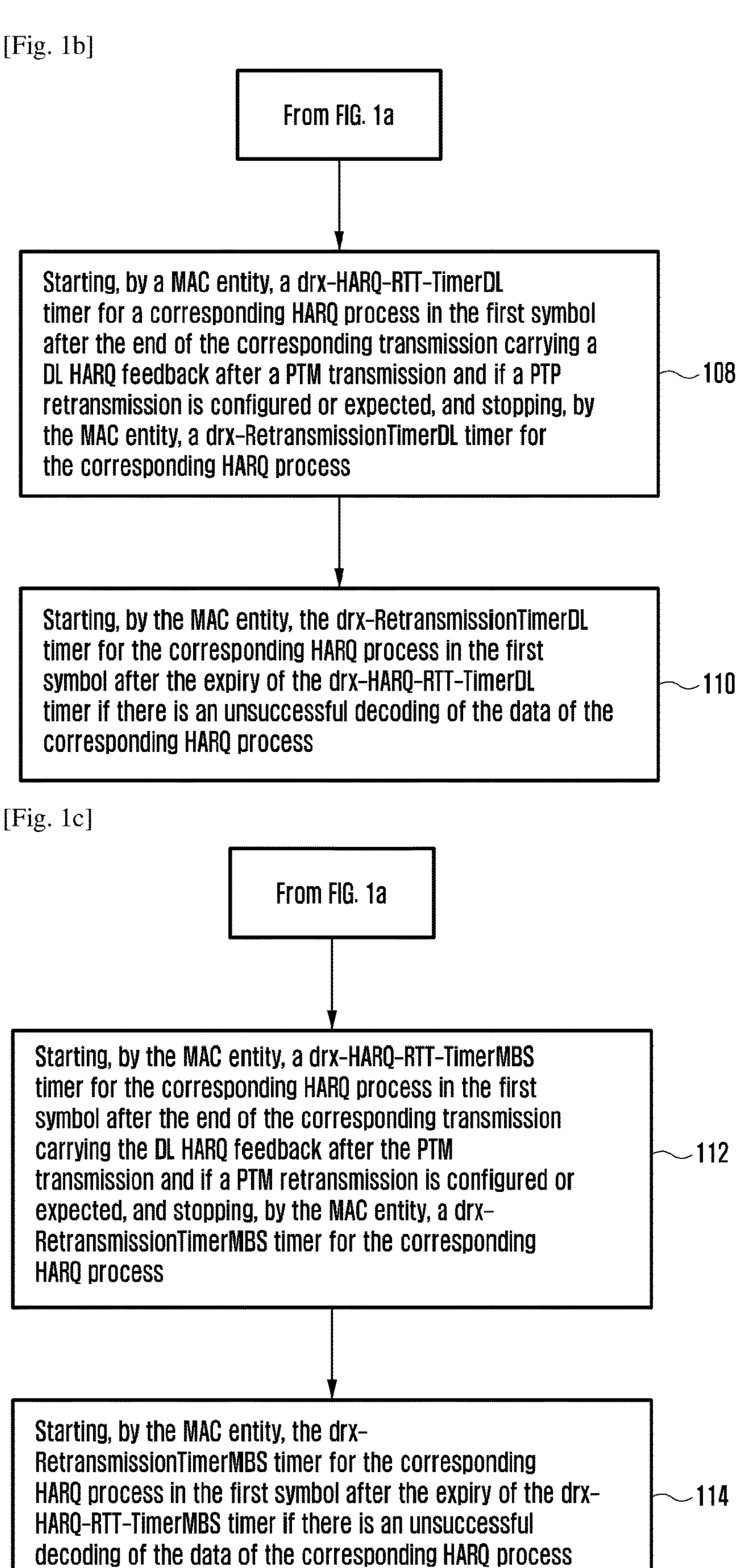

[Fig. 1d]
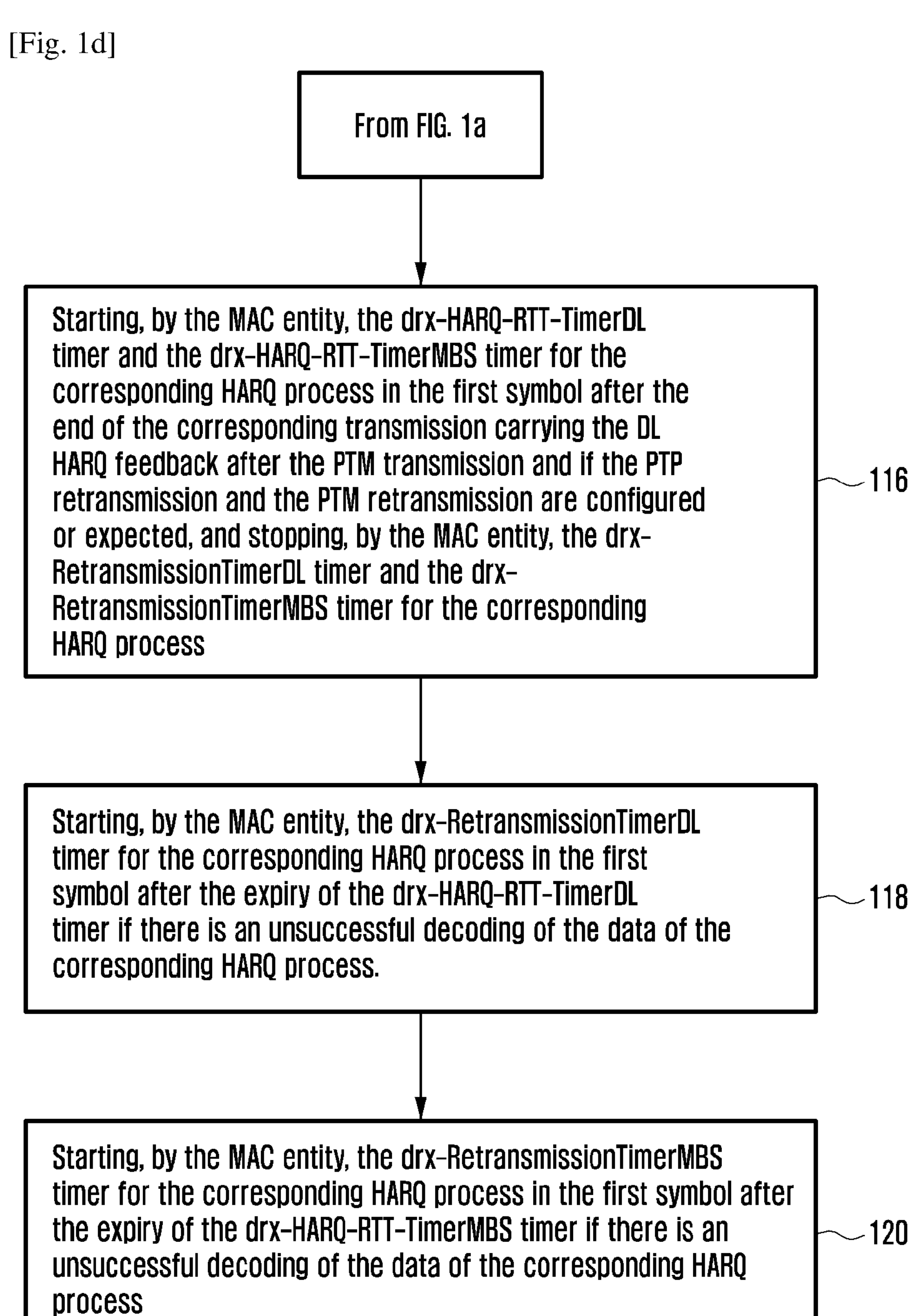

Figure 2A:
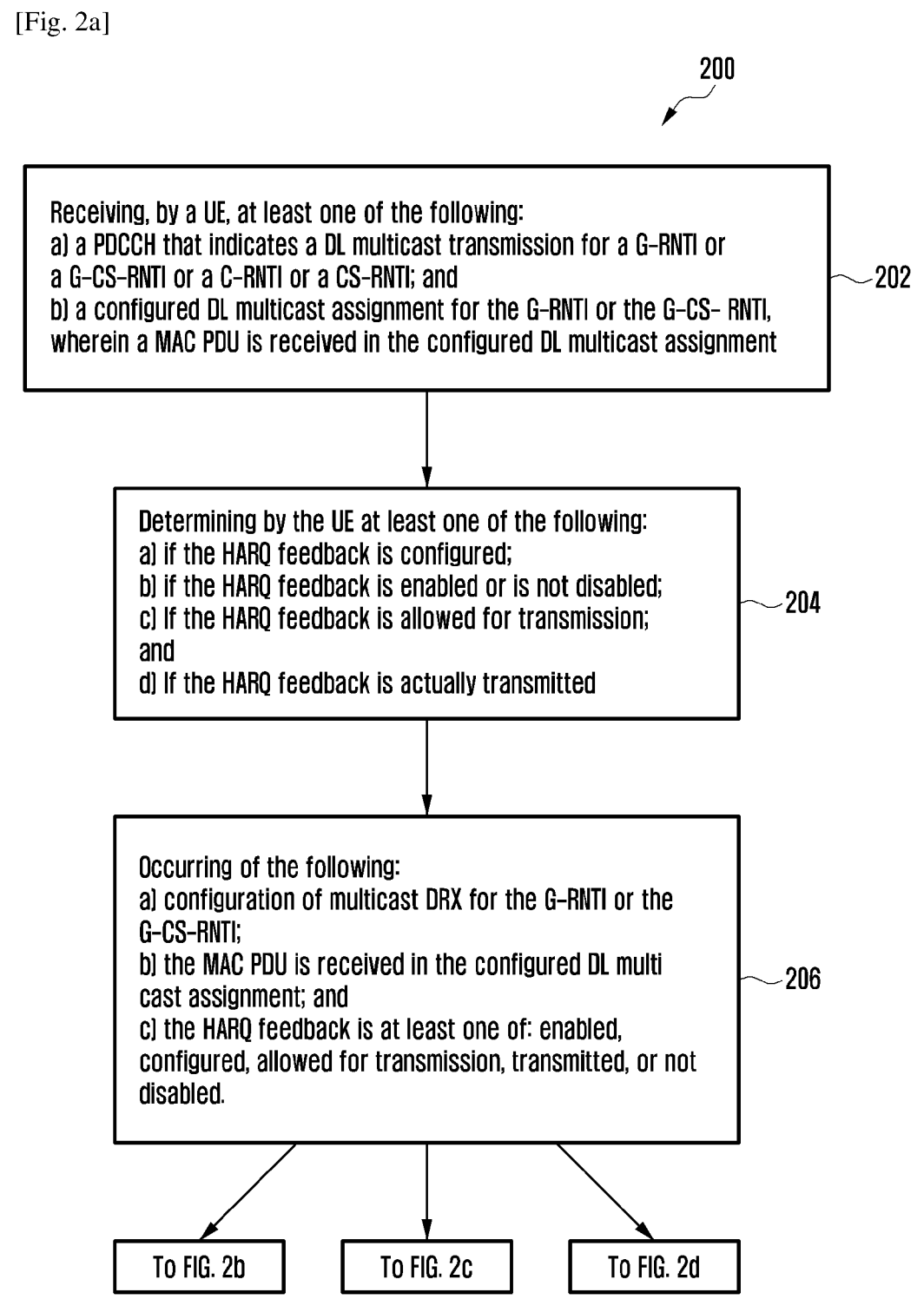

Receiving, by a UE, at least one of the following:
a) a PDCCH that indicates a DL multicast transmission for a G-RNTI or a G-CS-RNTI or a C-RNTI or a CS-RNTI; and
b) a configured DL multicast assignment for the G-RNTI or the G-CS- RNTI, wherein a MAC PDU is received in the configured DL multicast assignment

202

Determining by the UE at least one of the following:
a) if the HARQ feedback is configured;
b) if the HARQ feedback is enabled or is not disabled;
c) If the HARQ feedback is allowed for transmission; and
d) If the HARQ feedback is actually transmitted

204

Occurring of the following:
a) configuration of multicast DRX for the G-RNTI or the G-CS-RNTI;
b) the MAC PDU is received in the configured DL multi cast assignment; and
c) the HARQ feedback is at least one of: enabled, configured, allowed for transmission, transmitted, or not disabled.

[Fig. 2b]
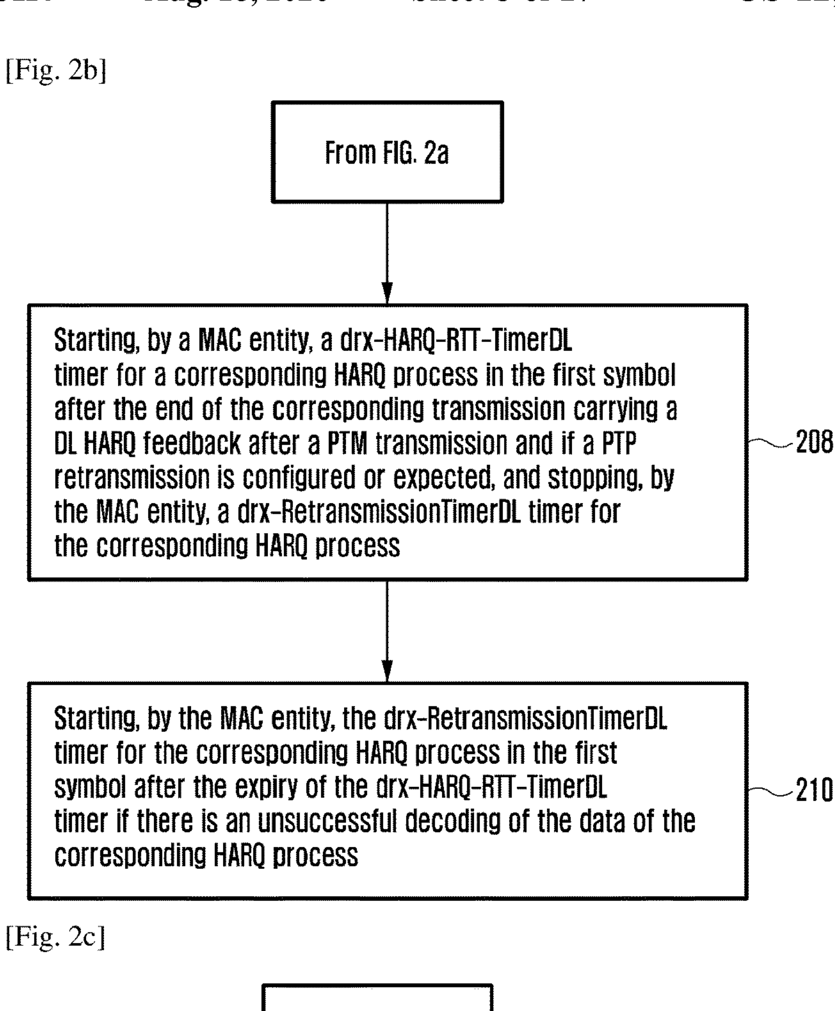
[Fig. 2c]
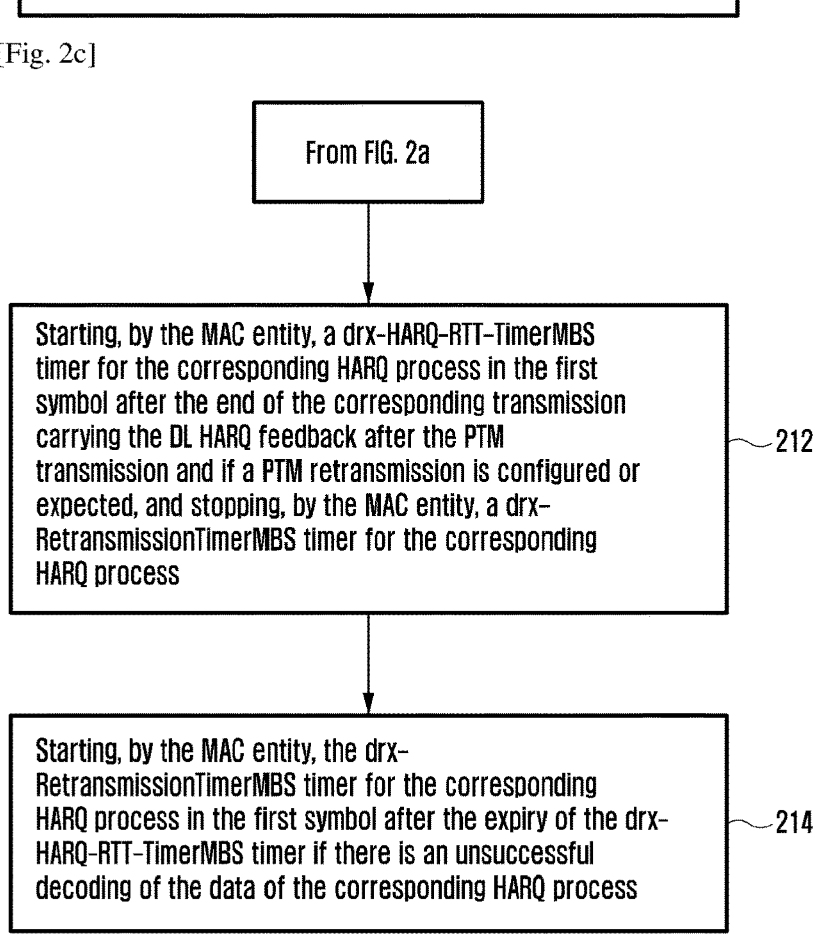

[Fig. 2d]
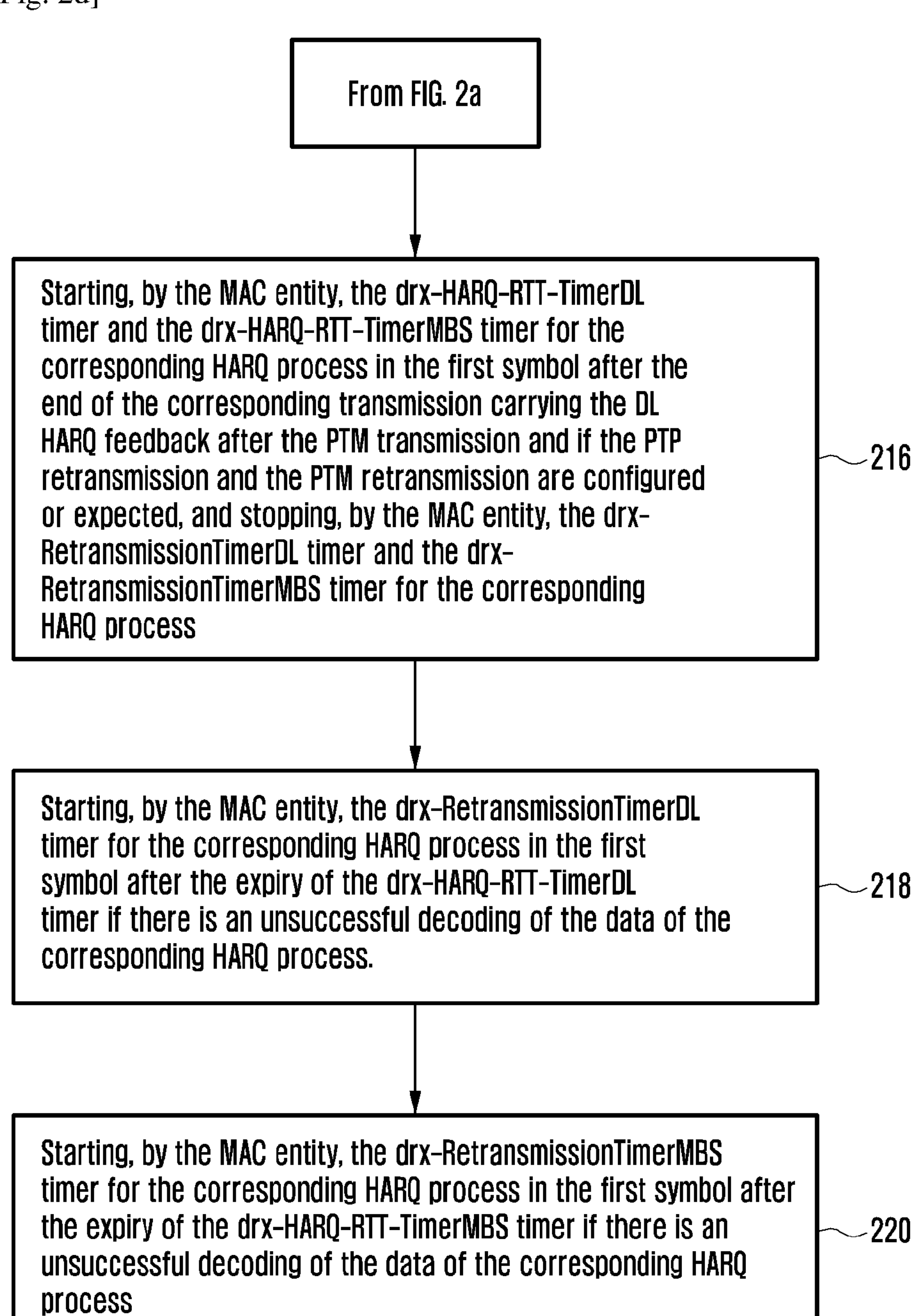

[Fig. 3a]
[Fig. 3b]
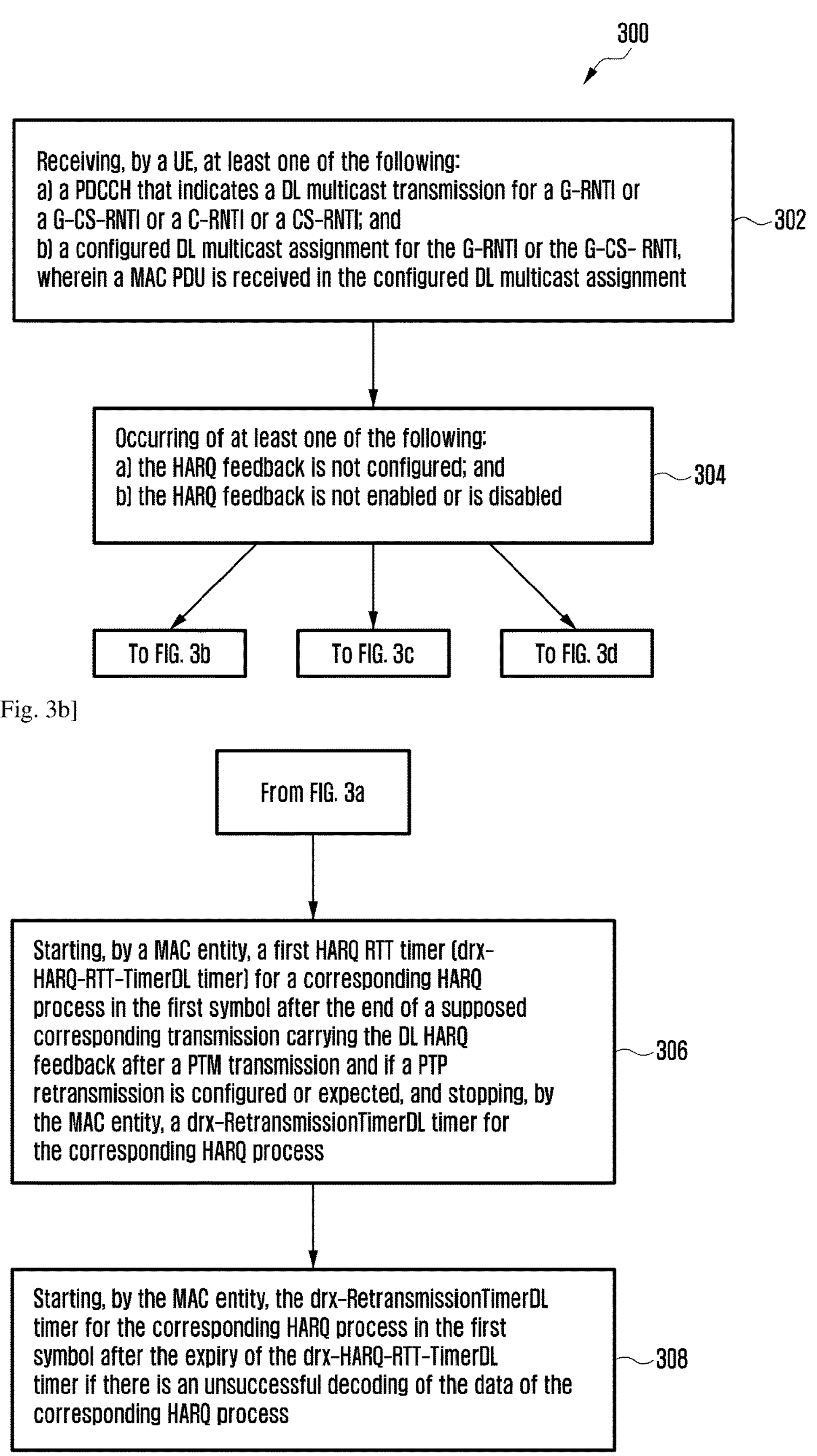

[Fig. 3c]
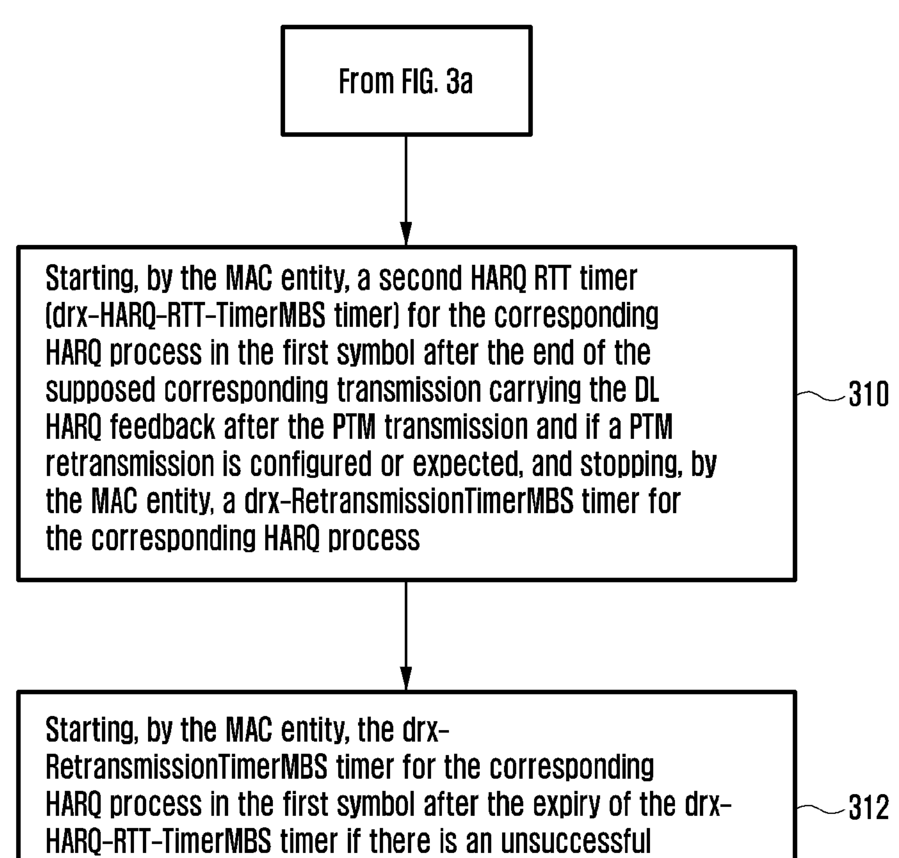

[Fig. 3d]

[Fig. 4a]
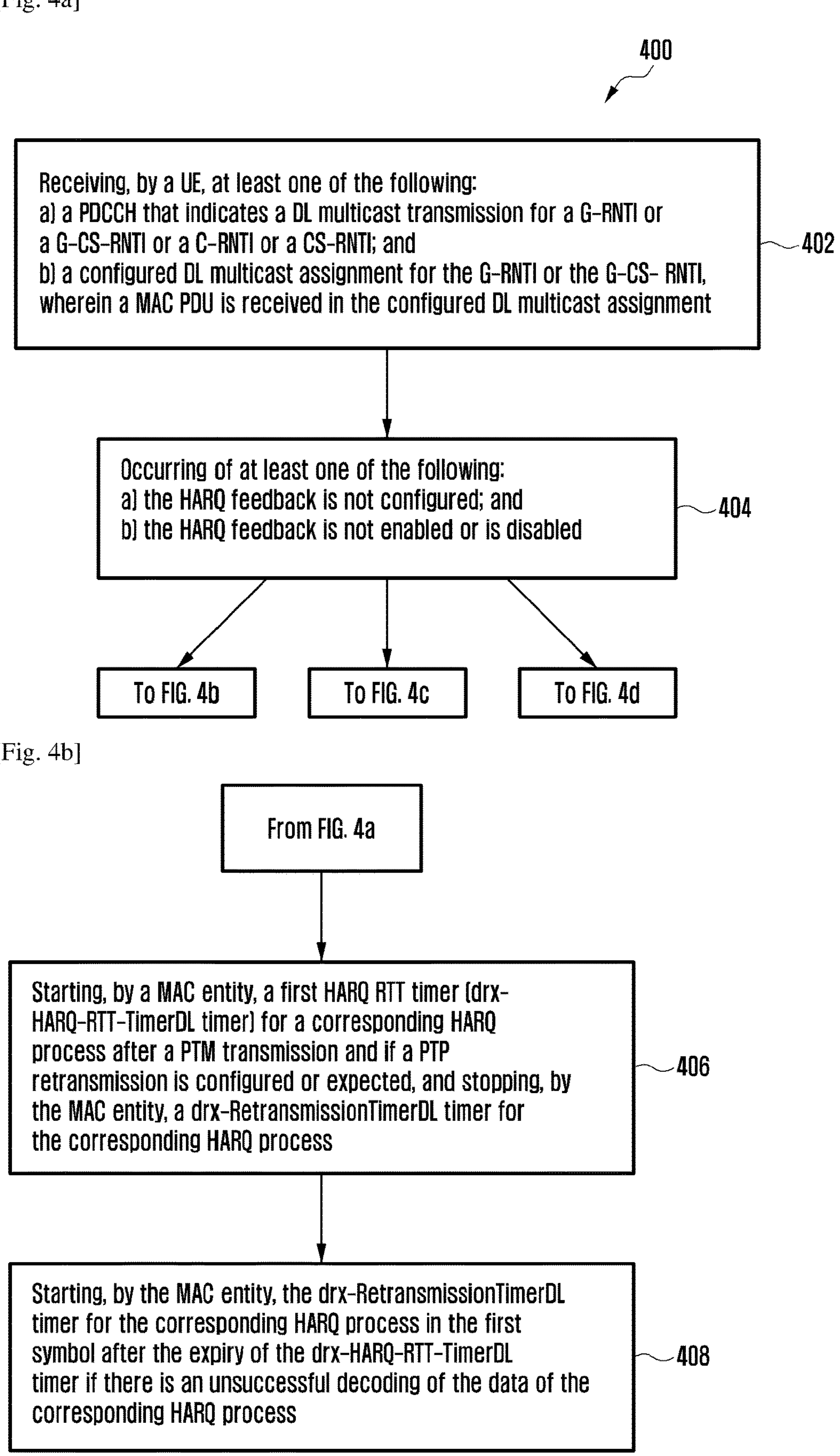
[Fig. 4b]

[Fig. 4c]

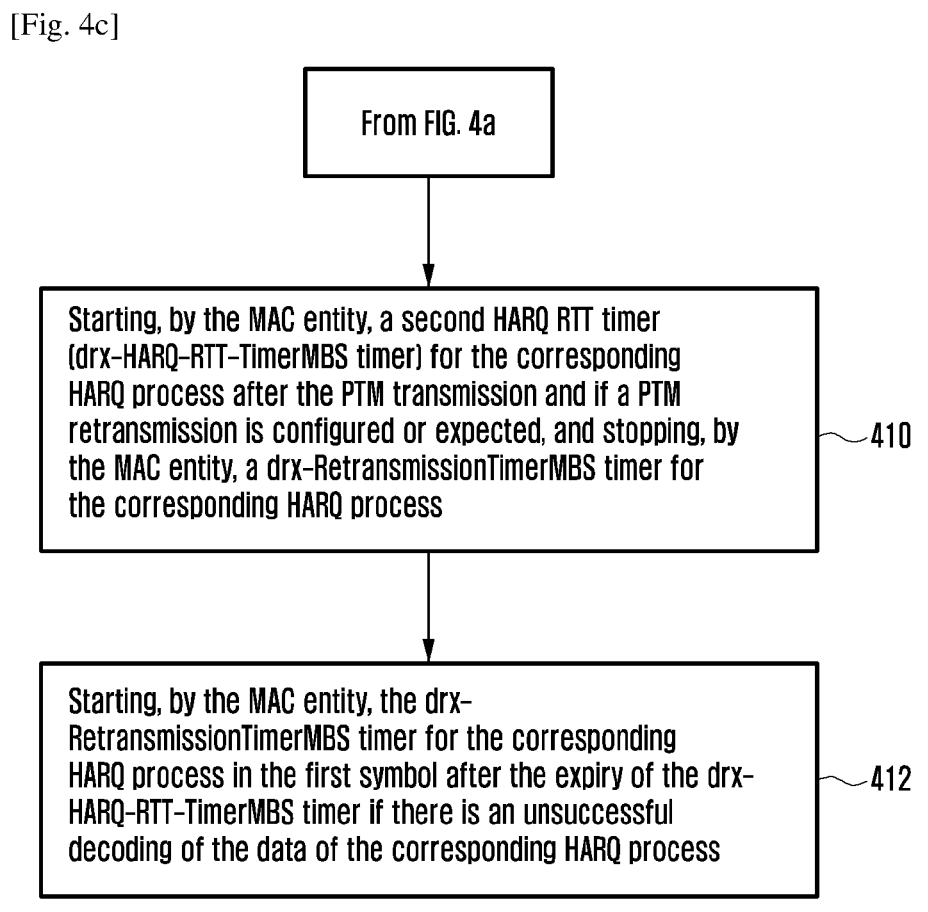

From FIG. 4a

Starting, by the MAC entity, a second HARQ RTT timer (drx-HARQ-RTT-TimerMBS timer) for the corresponding HARQ process after the PTM transmission and if a PTM retransmission is configured or expected, and stopping, by the MAC entity, a drx-RetransmissionTimerMBS timer for the corresponding HARQ process — 410

Starting, by the MAC entity, the drx-RetransmissionTimerMBS timer for the corresponding HARQ process in the first symbol after the expiry of the drx-HARQ-RTT-TimerMBS timer if there is an unsuccessful decoding of the data of the corresponding HARQ process — 412

[Fig. 4d]
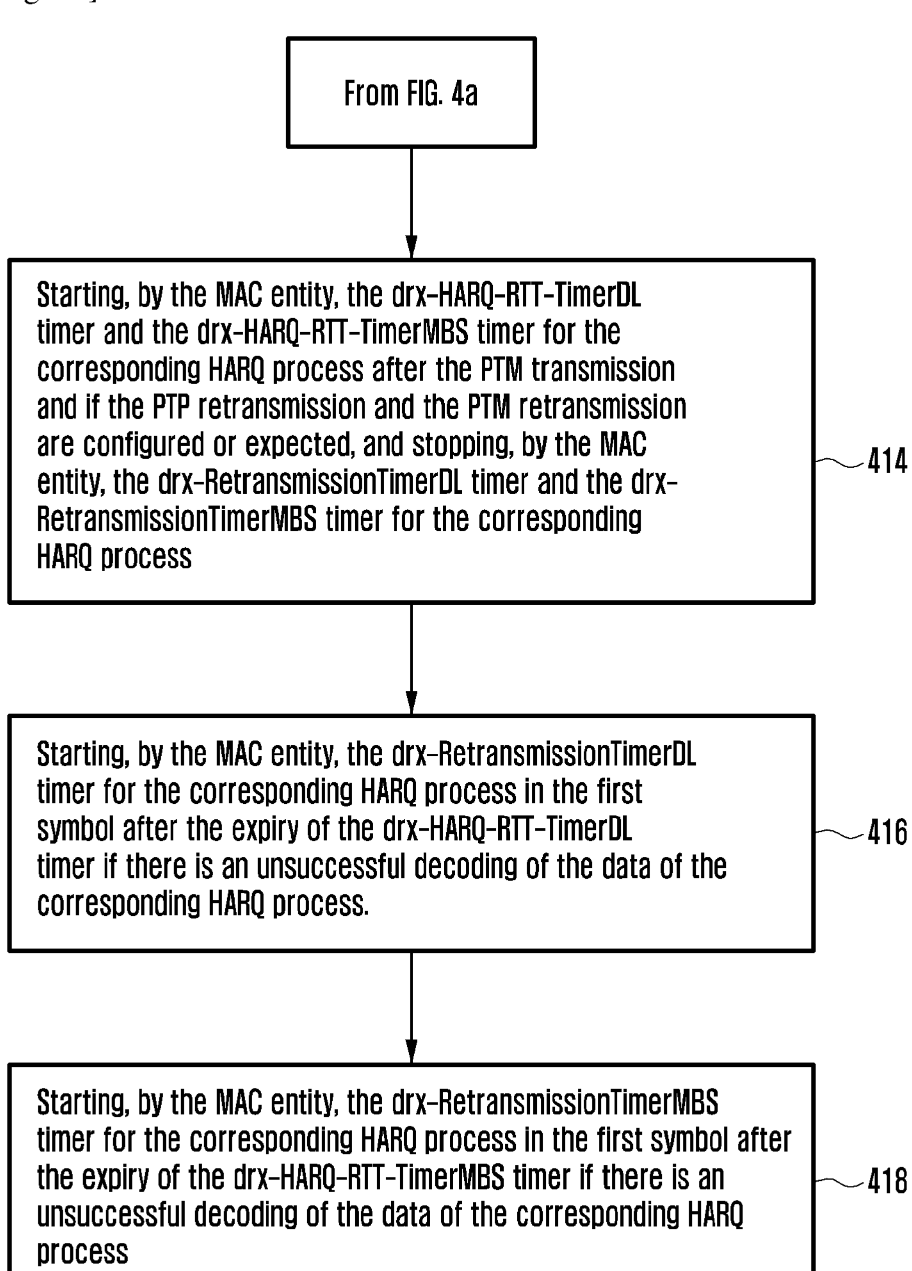

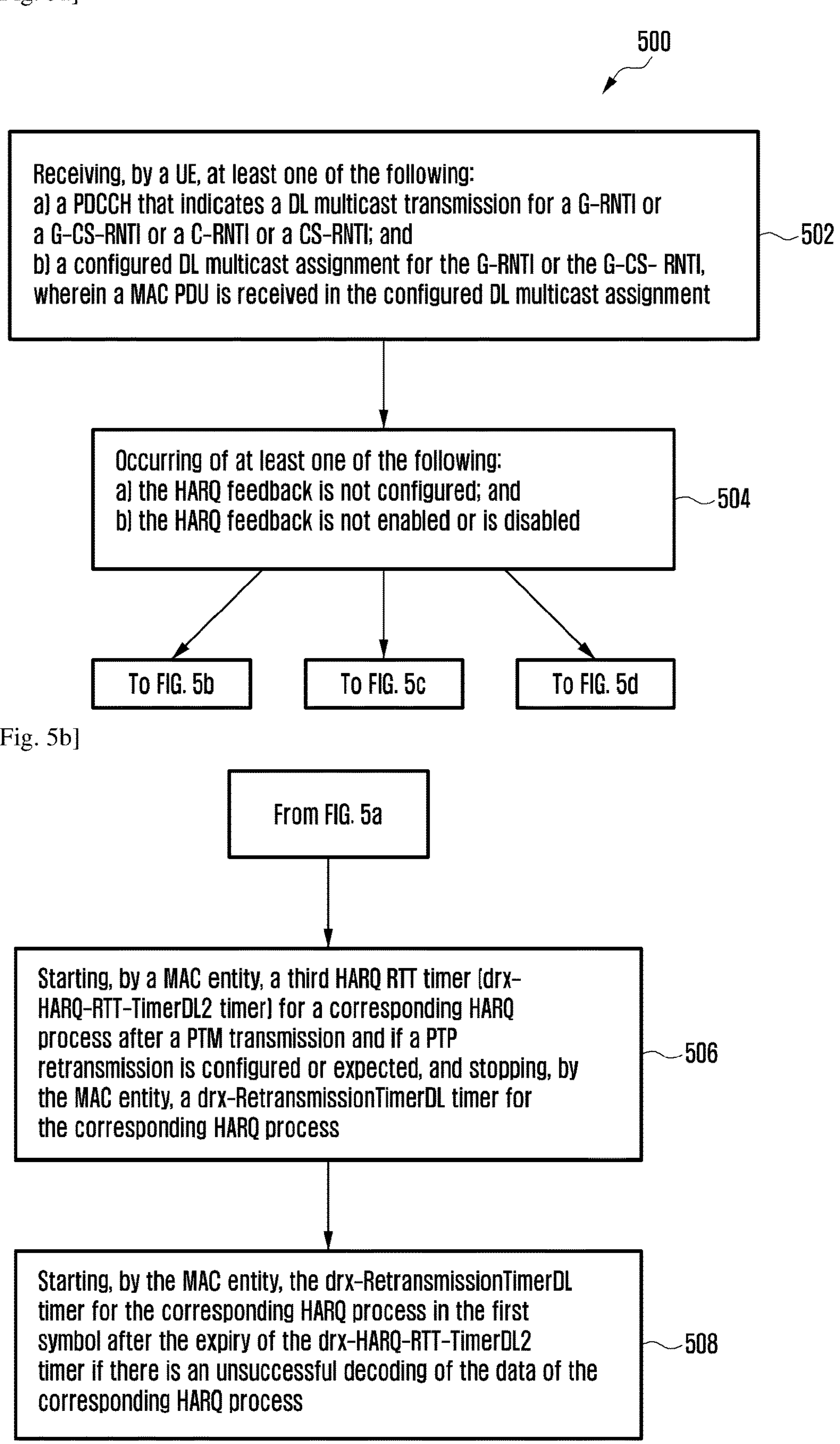
[Fig. 5a]
500
Receiving, by a UE, at least one of the following:
a) a PDCCH that indicates a DL multicast transmission for a G-RNTI or a G-CS-RNTI or a C-RNTI or a CS-RNTI; and
b) a configured DL multicast assignment for the G-RNTI or the G-CS- RNTI, wherein a MAC PDU is received in the configured DL multicast assignment
502
Occurring of at least one of the following:
a) the HARQ feedback is not configured; and
b) the HARQ feedback is not enabled or is disabled
504
To FIG. 5b
To FIG. 5c
To FIG. 5d
[Fig. 5b]
From FIG. 5a
Starting, by a MAC entity, a third HARQ RTT timer (drx-HARQ-RTT-TimerDL2 timer) for a corresponding HARQ process after a PTM transmission and if a PTP retransmission is configured or expected, and stopping, by the MAC entity, a drx-RetransmissionTimerDL timer for the corresponding HARQ process
506
Starting, by the MAC entity, the drx-RetransmissionTimerDL timer for the corresponding HARQ process in the first symbol after the expiry of the drx-HARQ-RTT-TimerDL2 timer if there is an unsuccessful decoding of the data of the corresponding HARQ process
508

[Fig. 5c]

[Fig. 5d]
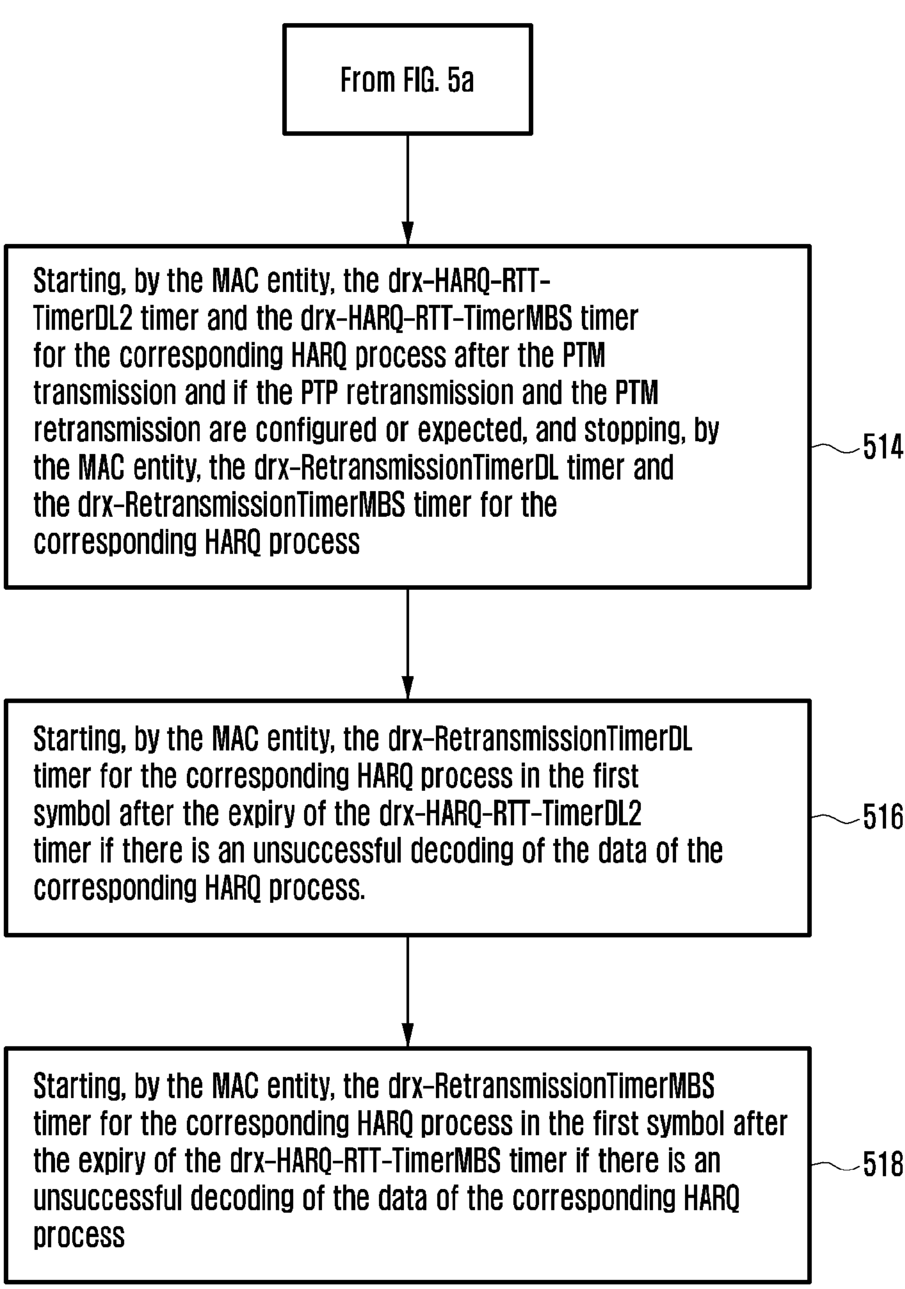

[Fig. 6]
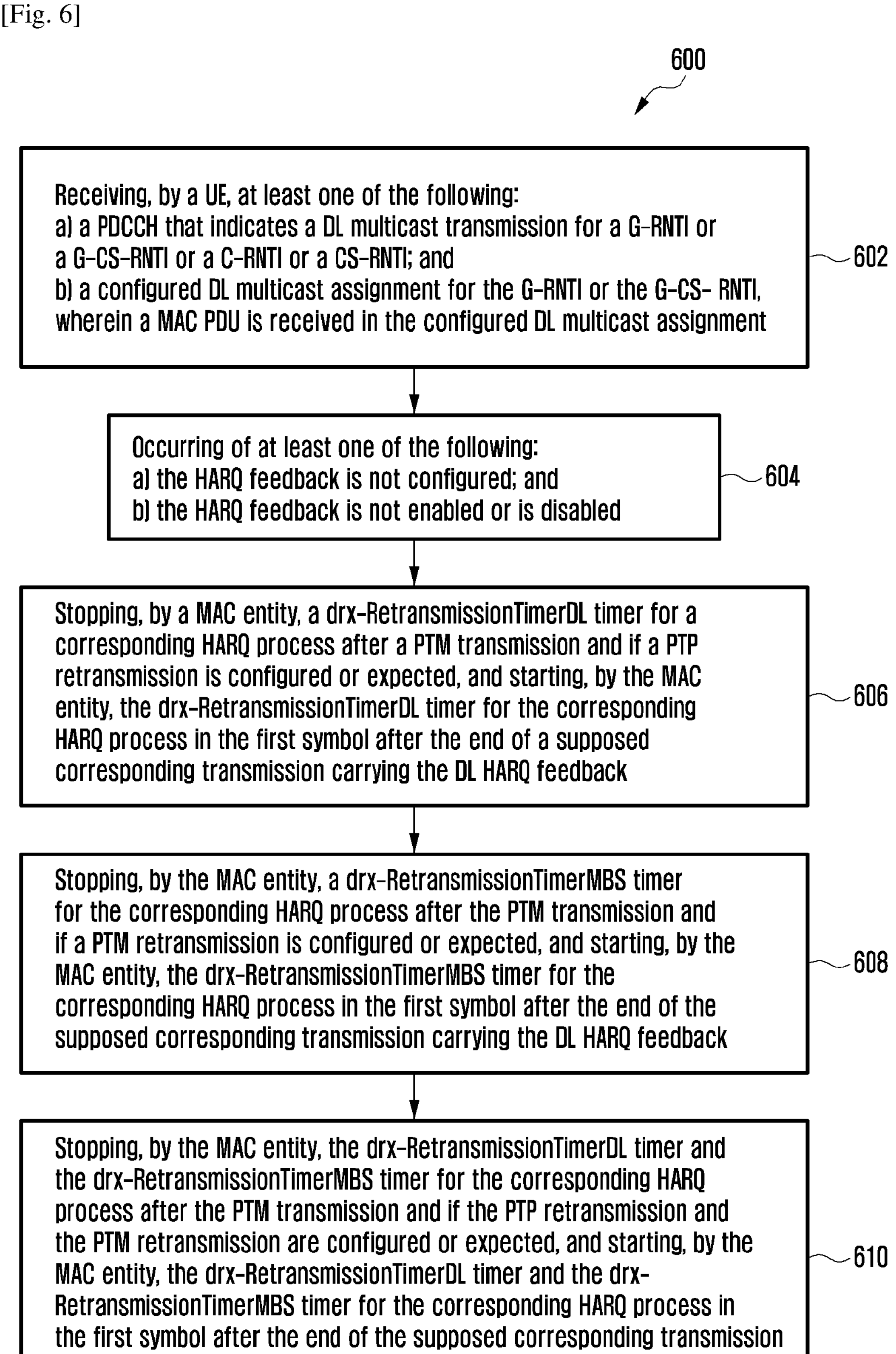

[Fig. 7]
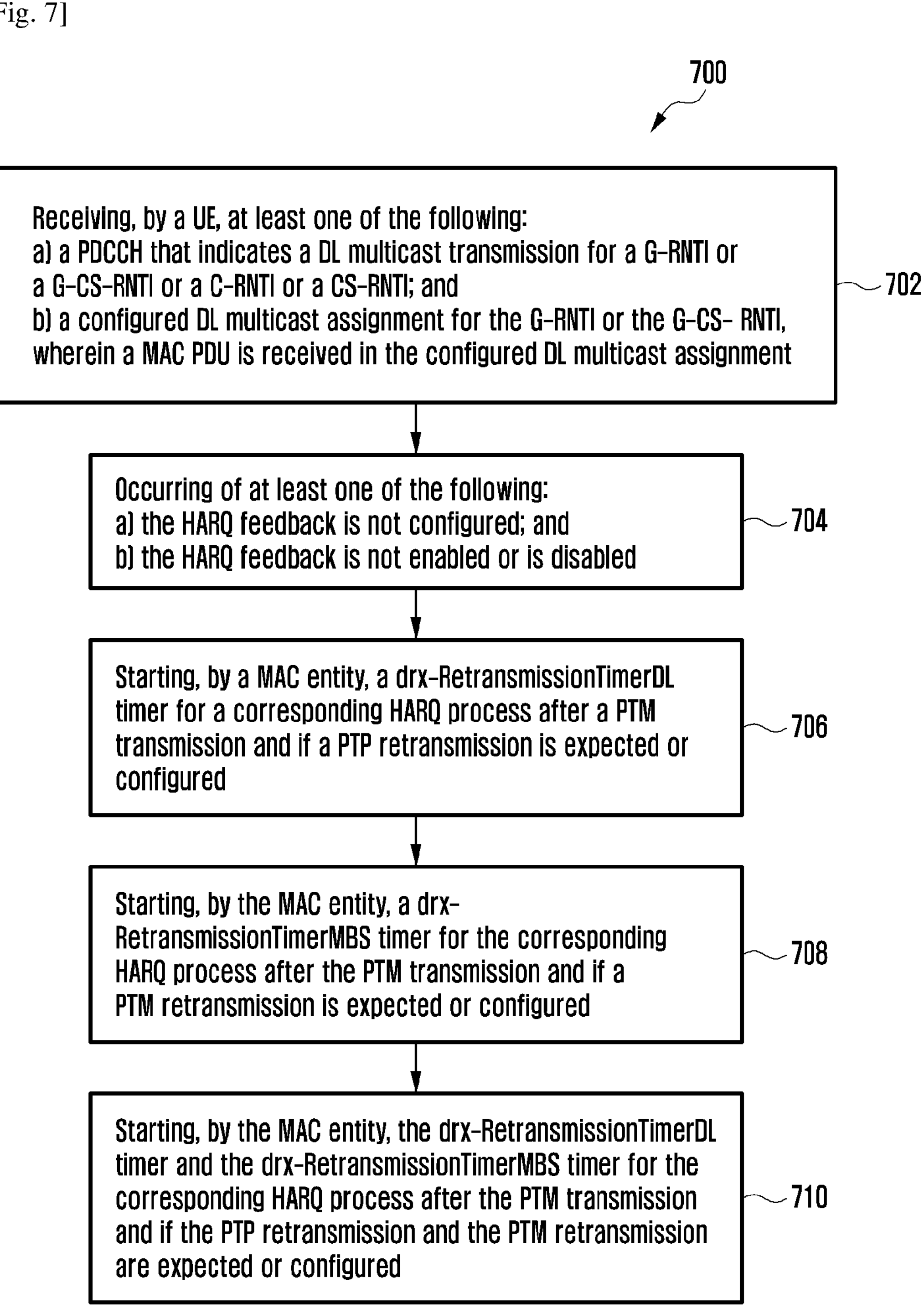

[Fig. 8a]
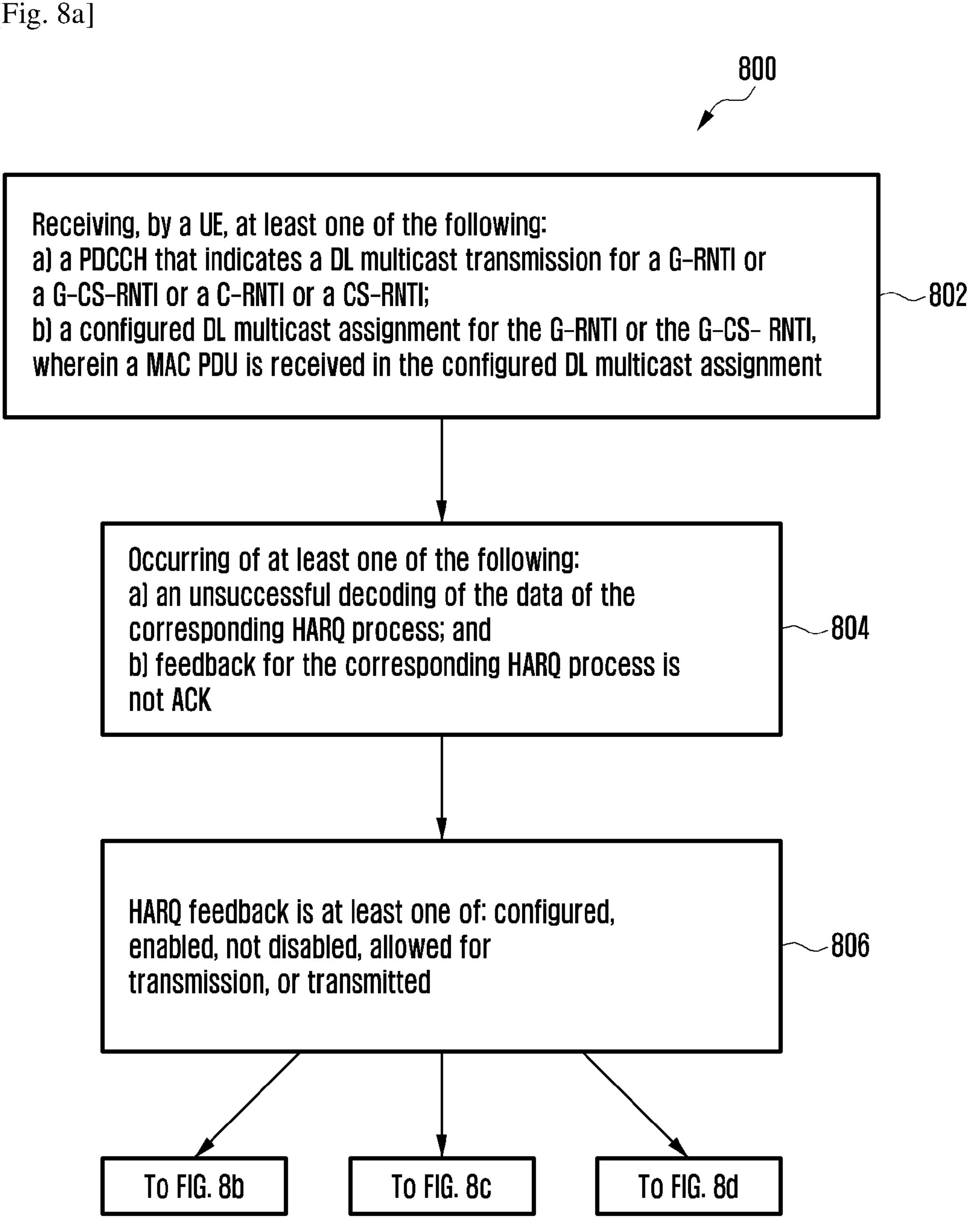

[Fig. 8b]
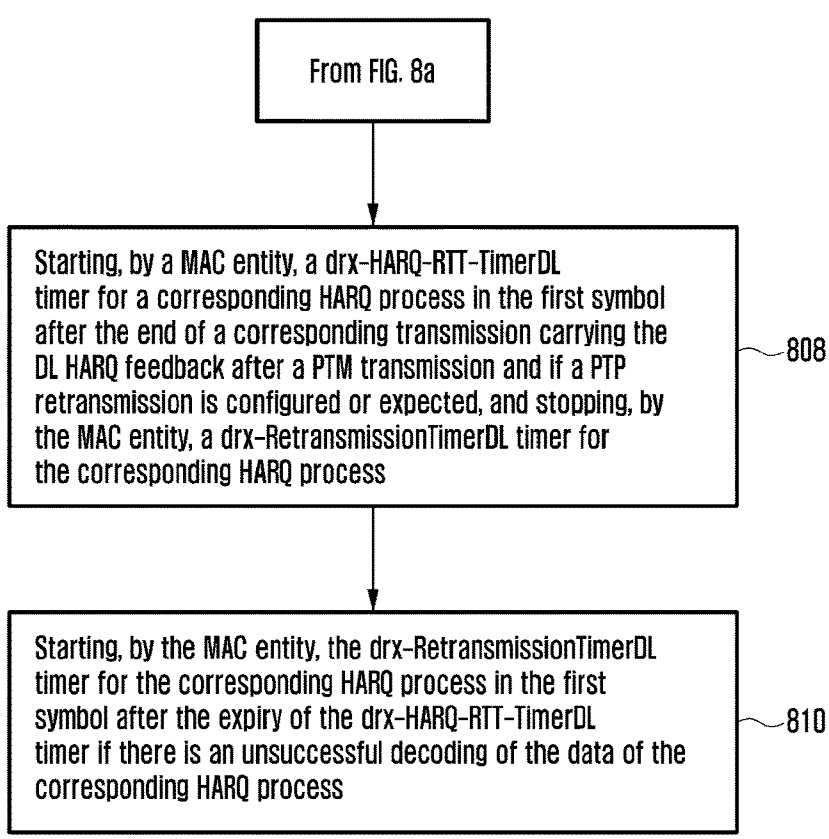
[Fig. 8c]
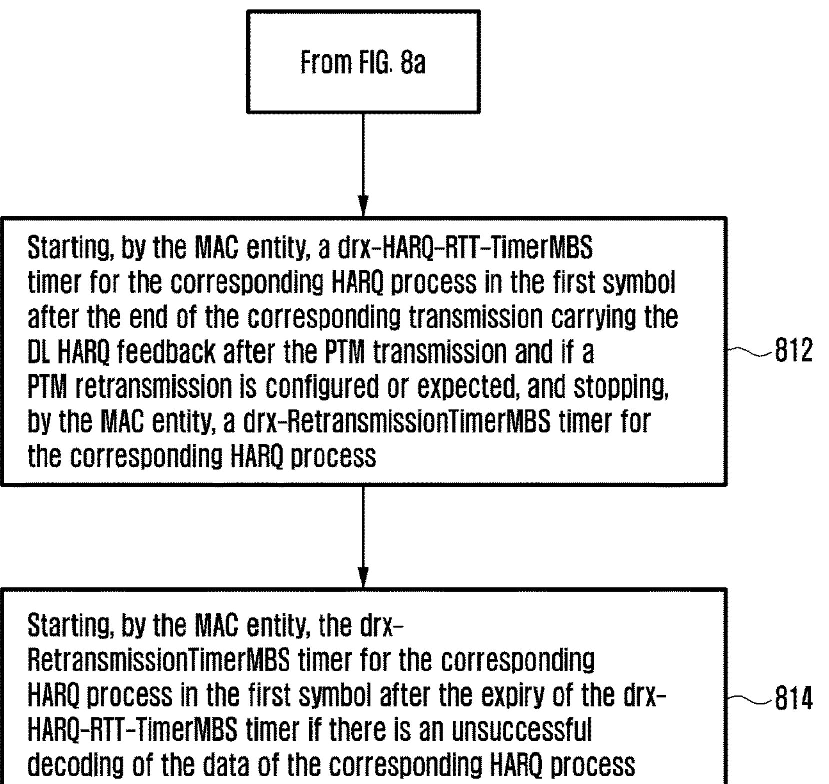

[Fig. 8d]

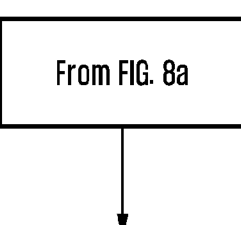

Starting, by the MAC entity, the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and the PTM retransmission are configured or expected, and stopping, by the MAC entity, the drx-RetransmissionTimerDL timer and the drx-RetransmissionTimerMBS timer for the corresponding HARQ process

816

Starting, by the MAC entity, the drx-RetransmissionTimerDL timer for the corresponding HARQ process in the first symbol after the expiry of the drx-HARQ-RTT-TimerDL timer if there is an unsuccessful decoding of the data of the corresponding HARQ process.

818

Starting, by the MAC entity, the drx-RetransmissionTimerMBS timer for the corresponding HARQ process in the first symbol after the expiry of the drx-HARQ-RTT-TimerMBS timer if there is an unsuccessful decoding of the data of the corresponding HARQ process

820

[Fig. 9]
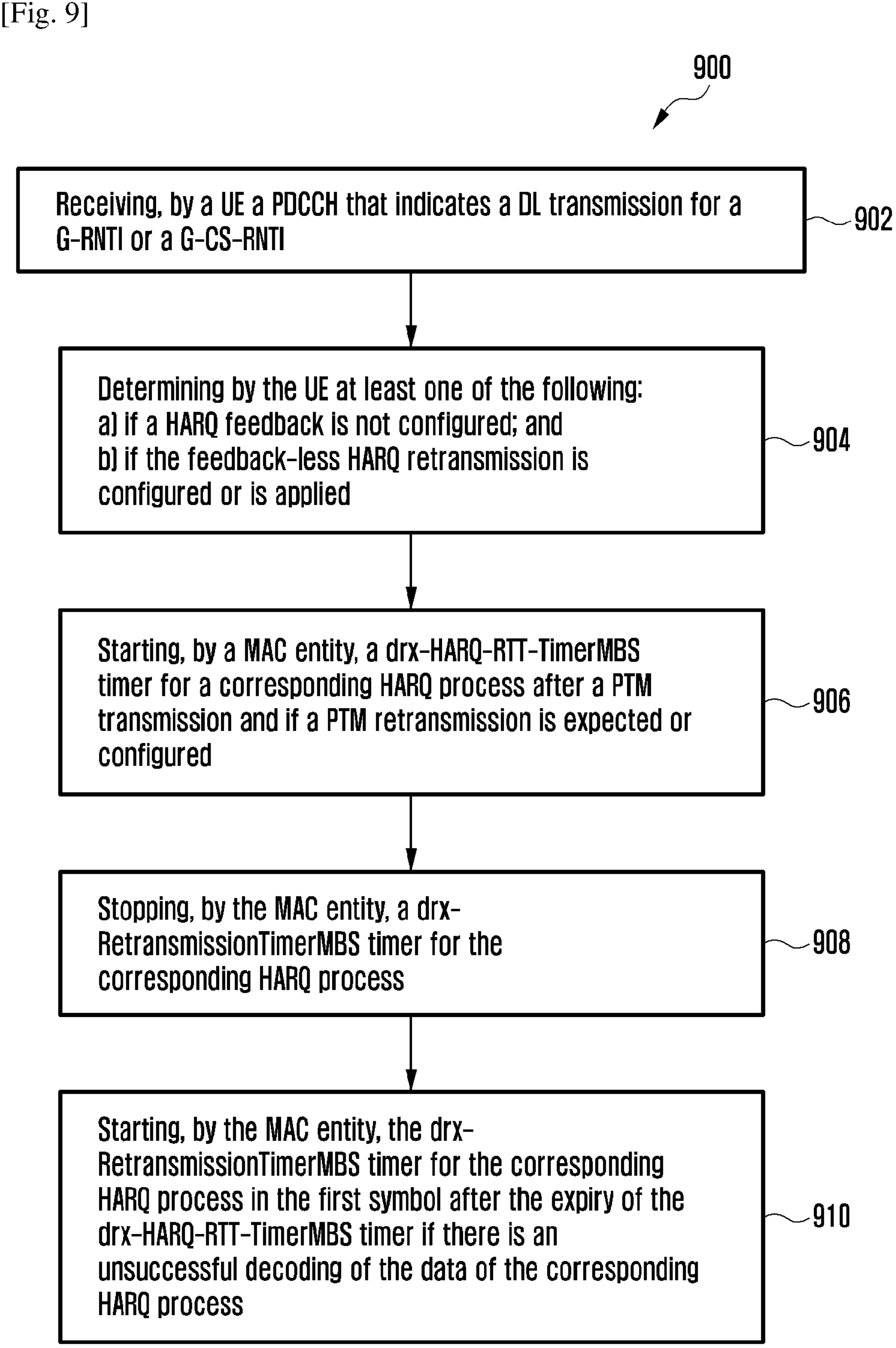

[Fig. 10]
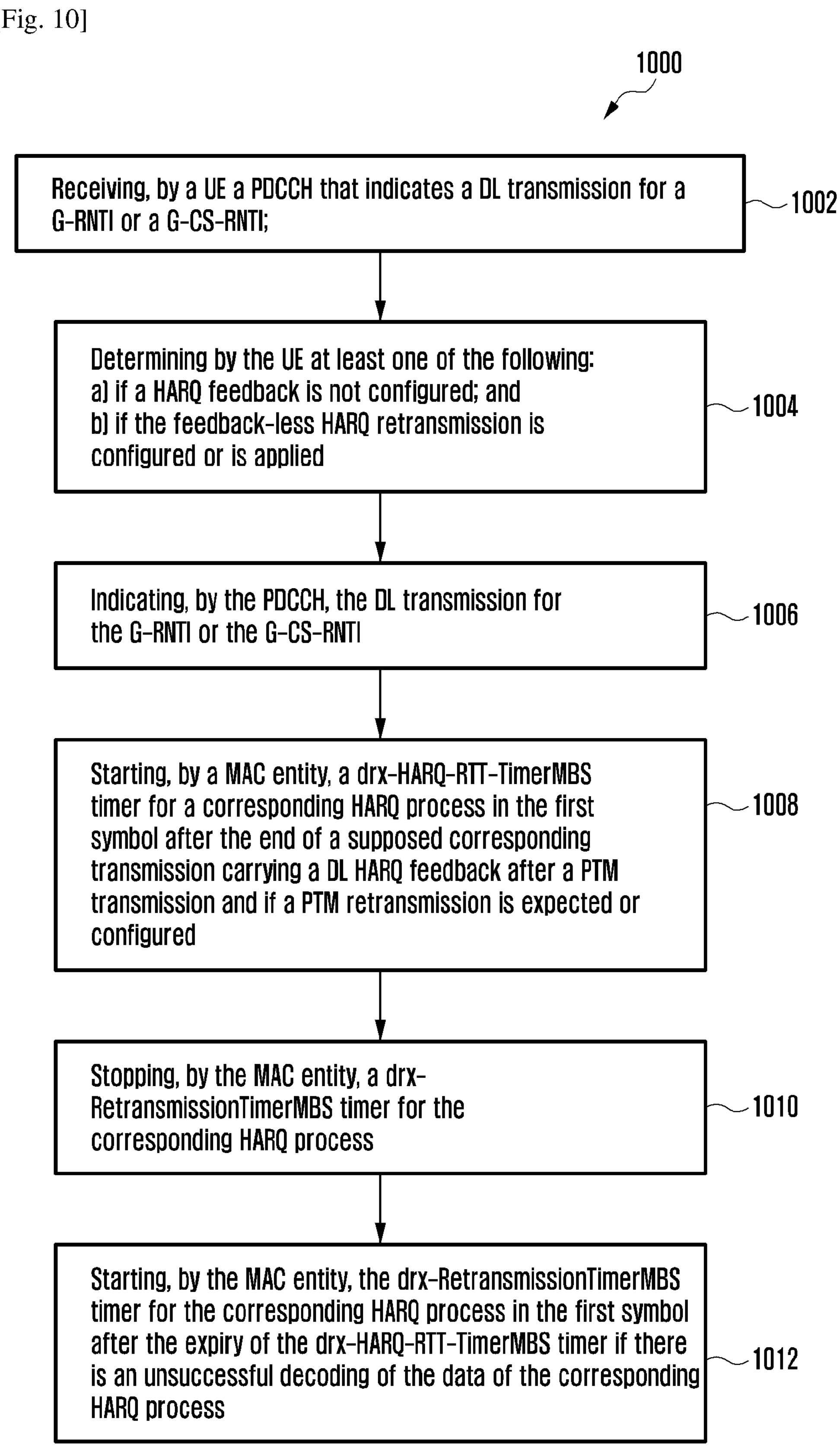

[Fig. 11]
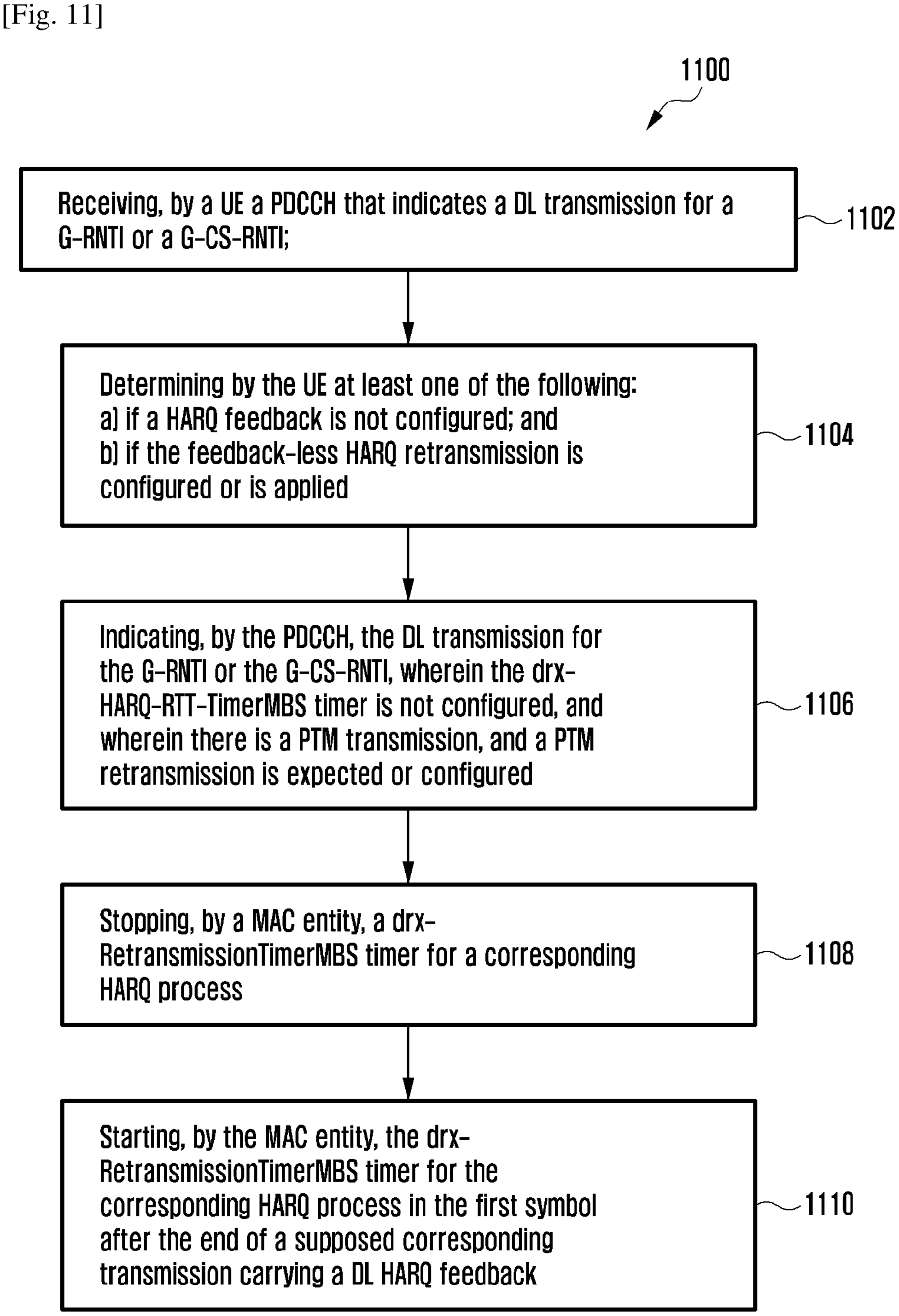

[Fig. 12]
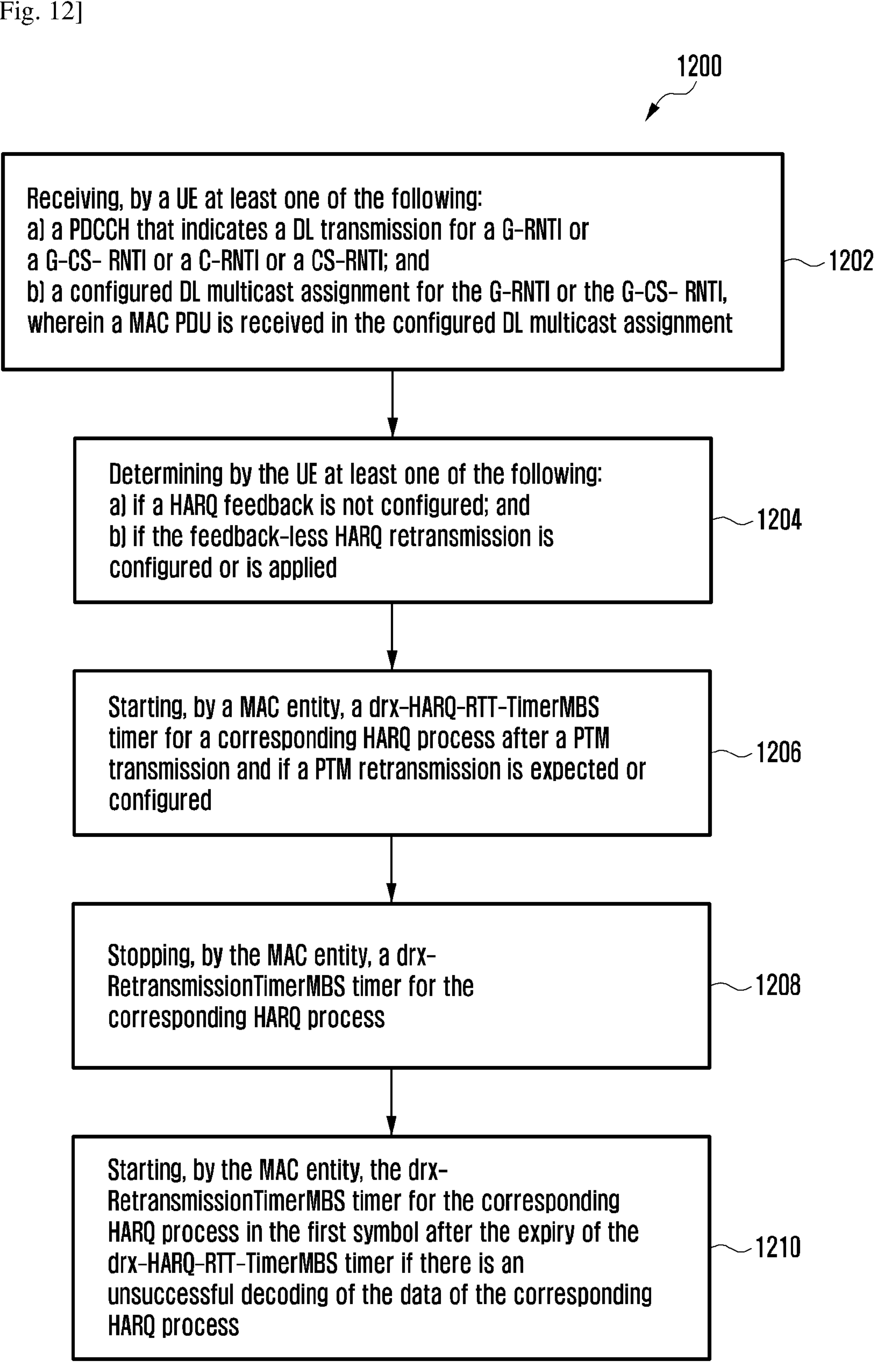

[Fig. 13]
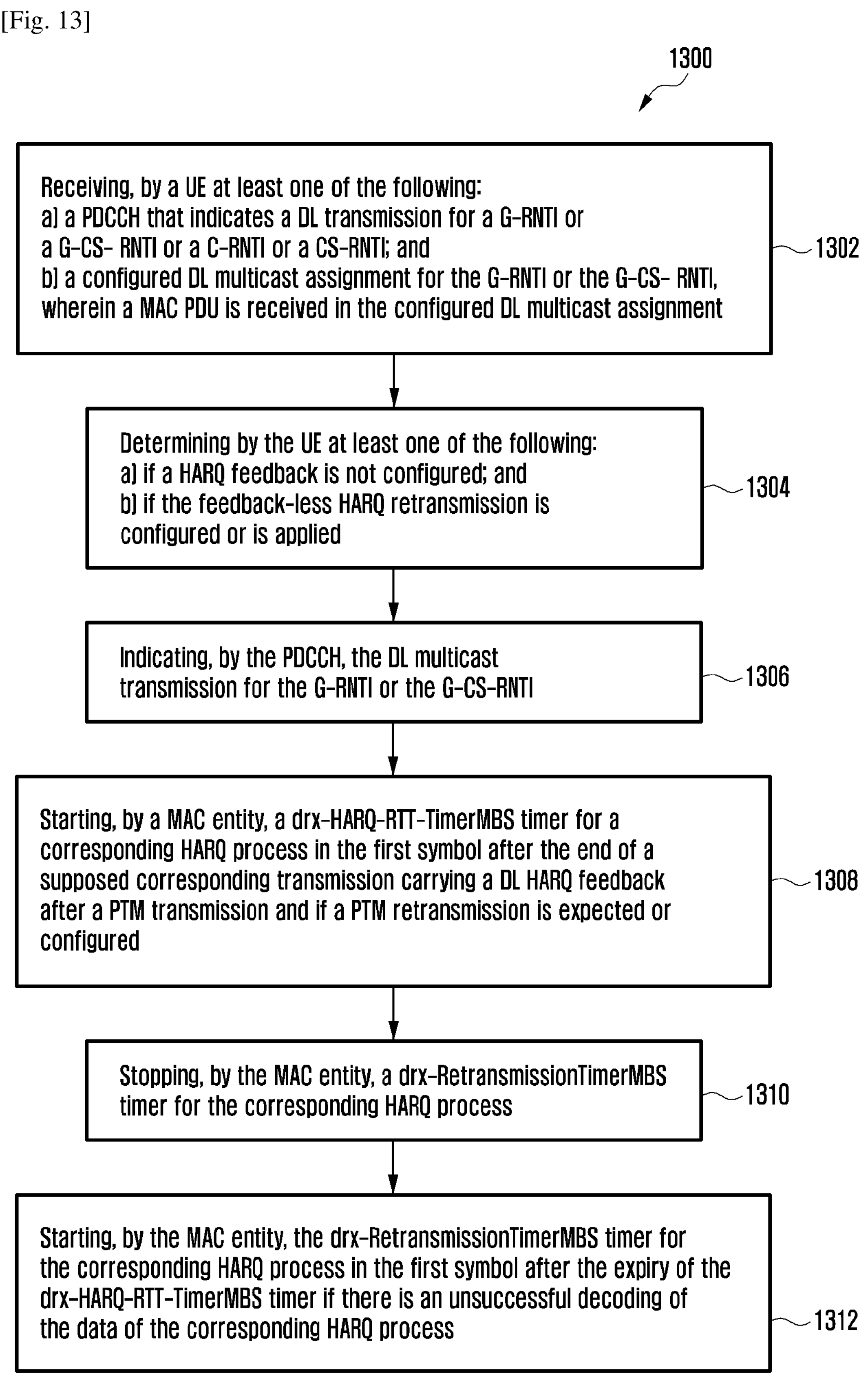

[Fig. 14]
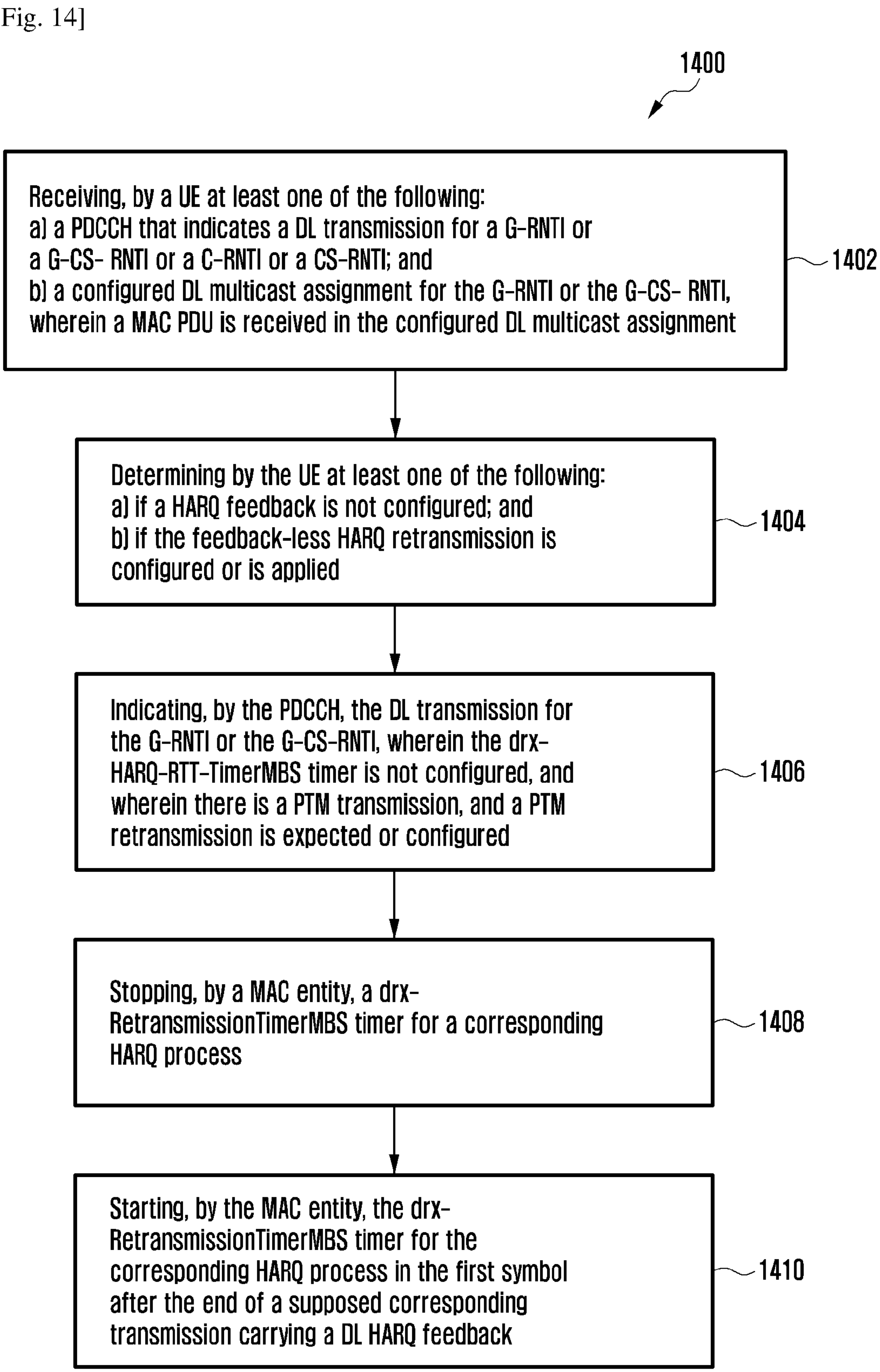

[Fig. 15]
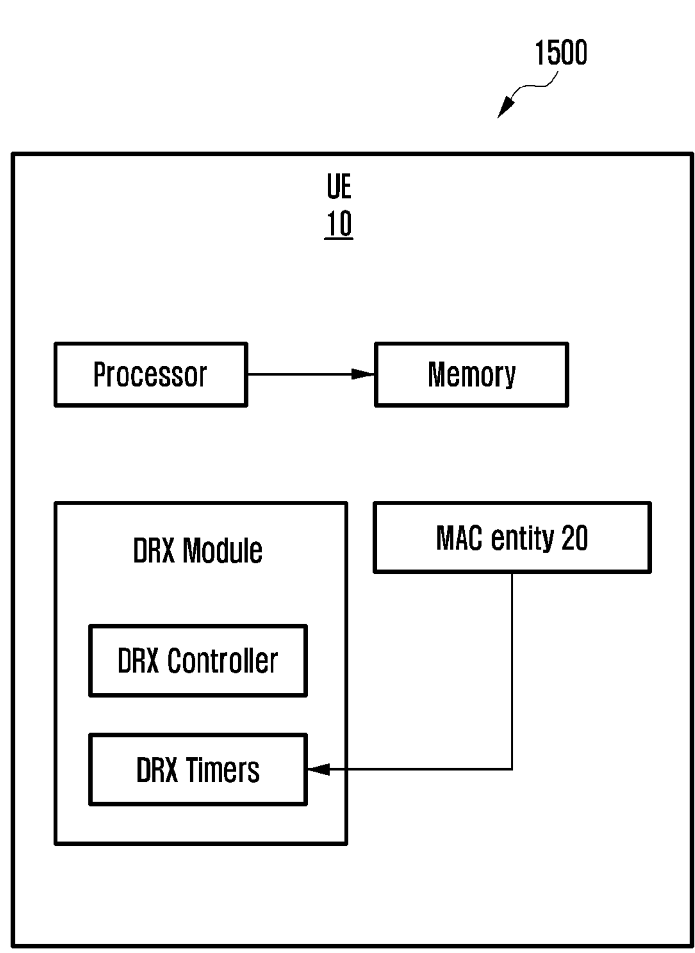

METHODS AND SYSTEMS OF HARQ RETRANSMISSION FOR NR MBS SERVICES

CROSS-REFERENCE TO RELATED APPLICATIONS

This application is a 371 of International Application No. PCT/KR2022/005896 filed on Apr. 26, 2022, which claims priority to India Patent Application No. 202141019163 filed on Apr. 26, 2021, and India Patent Application No. 202141019163 filed on Apr. 7, 2022, the disclosures of which are herein incorporated by reference in their entirety.

BACKGROUND

1. Field

Embodiments disclosed herein relate to wireless communication networks, and more particularly to HARQ retransmission for New Radio Multicast Broadcast Service (NR MBS) in wireless communication networks.

2. Description of Related Art 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

NR MBS services can refer to multicast services where intended common contents are targeted to a group of user equipment (UEs) which have joined the multicast group in the multicast coverage area and broadcast services where intended contents are targeted to all the UEs in the broadcast coverage area. These coverages area can be one cell or larger.

Two delivery methods are envisioned for 5G MBS services, from the view point of 5G Core Network (CN): Individual MBS traffic delivery method, and shared MBS traffic delivery method. For the individual MBS traffic delivery method, the CN may receive a single copy of the MBS data packets and deliver separate copies of those MBS data packets to individual UEs via per-UE PDU sessions. For the shared MBS traffic delivery method, the 5G CN may receive a single copy of the MBS data packets and deliver a single copy of the MBS packets packet to a Radio Access Node (RAN), which may then deliver the MBS packets to one or multiple UEs. The RAN may deliver the MBS data to the UEs using either Point-to-Point delivery (PTP) or Point-to-Multipoint (PTM) delivery. Further, at the UE, the MBS bearer can be composed of a common packet data convergence protocol (PDCP) entity with either PTP, PTM or a combination of PTP and PTM legs or radio link control (RLC) entities.

For the purpose of power saving and efficient scheduling, unicast reception may be associated with a unicast discontinuous reception (DRX) approach. Further, it is desirable to have a DRX approach for reception of MBS services on PTM and PTP paths. Unlike LTE eMBMS (which supports primarily broadcasted services), NR MBS may also be targeted to support higher reliability multicast services for which increased reliability is desired (e.g., hybrid automatic repeat request (HARQ) retransmissions).

It is desirable to have a DRX approach and HARQ transmission and retransmission for MBS packets in order to support power efficient and reliable delivery of 5G MBS services. Further, the mechanisms should work for the PTM and PTP based delivery framework for NR MBS.

Unicast reception may be associated with a unicast discontinuous reception (DRX) approach for the purpose of power saving and efficient scheduling. Further, it is desirable to have a DRX approach for reception of MBS services on PTM and PTP paths. It is desirable to have a DRX approach and HARQ transmission and retransmission for MBS packets in order to support power efficient and reliable delivery of 5G MBS services. Further, the mechanisms should work for the PTM and PTP based delivery framework for NR MBS. The present invention has been made to provide at least the advantages described below.

SUMMARY

Accordingly, the embodiments herein provide methods and systems of HARQ retransmission for NR MBS services. A first method disclosed herein for managing hybrid automatic repeat request (HARQ) transmission in a wireless communication network, comprises receiving, by a user equipment (UE), at least one of the following: a physical downlink control channel (PDCCH) that indicates a downlink (DL) multicast transmission for a group radio network temporary identifier (G-RNTI) or a group configured scheduling radio network temporary identifier (G-CS-RNTI) or a cell-RNTI (C-RNTI) or a CS-RNTI; and a configured DL multicast assignment for the G-RNTI or the G-CS-RNTI, wherein a medium access control (MAC) protocol data unit (PDU) is received in the configured DL multicast assignment. The method further comprises determining, by the UE, if a HARQ feedback is at least one of: configured, enabled, not disabled, allowed for transmission, and transmitted.

If the PDCCH indicates the DL multicast transmission for the G-RNTI or the G-CS-RNTI, and the HARQ feedback is at least one of: enabled, configured, allowed for transmission, transmitted, or not disabled, then the first method further comprises performing, by a MAC entity, one of the following:

a. starting a drx-HARQ-RTT-TimerDL timer for a corresponding HARQ process in the first symbol after the end of the corresponding transmission carrying a DL HARQ feedback after the PTM transmission and if the PTP retransmission is configured or expected, and stopping a drx-RetransmissionTimerDL timer for the corresponding HARQ process;

b. starting a drx-HARQ-RTT-TimerMBS timer for the corresponding HARQ process in the first symbol after the end of the corresponding transmission carrying the DL HARQ feedback after the PTM transmission and if the PTM retransmission is configured or expected, and stopping a drx-RetransmissionTimerMBS timer for the corresponding HARQ process; and c. starting the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and the PTM retransmission are expected or configured, and stopping the drx-RetransmissionTimerDL timer and the drx-Retransmission-TimerMBS timer for the corresponding HARQ process.

The first method then further comprises starting the drx-RetransmissionTimerDL timer for the corresponding HARQ process after the expiry of the drx-HARQ-RTT-TimerDL timer if there is an unsuccessful decoding of the data of the corresponding HARQ process. The first method further comprises starting the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If a multicast discontinuous reception (DRX) is configured for the G-RNTI or the G-CS-RNTI, a MAC PDU is received in the configured DL multicast assignment, and the HARQ feedback is at least one of: enabled, configured, allowed for transmission, transmitted, or not disabled, then the first method further comprises performing, by the MAC entity, one of the following:

a. starting a drx-HARQ-RTT-TimerDL timer for a corresponding HARQ process in the first symbol after the end of the corresponding transmission carrying a DL HARQ feedback after the PTM transmission and if a PTP retransmission is configured or expected, and stopping a drx-RetransmissionTimerDL timer for the corresponding HARQ process;

b. starting a drx-HARQ-RTT-TimerMBS timer for the corresponding HARQ process in the first symbol after the end of the corresponding transmission carrying the DL HARQ feedback after the PTM transmission and if the PTM retransmission is configured or expected, and stopping a drx-RetransmissionTimerMBS timer for the corresponding HARQ process; and c. starting the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and the PTM retransmission are expected or configured, and stopping the drx-RetransmissionTimerDL timer and the drx-Retransmission-TimerMBS timer for the corresponding HARQ process.

The first method then further comprises starting the drx-RetransmissionTimerDL timer for the corresponding HARQ process in the first symbol after the expiry of the drx-HARQ-RTT-TimerDL timer if there is an unsuccessful decoding of the data of the corresponding HARQ process. The first method further comprises starting the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

In the first method, the UE performs at least one of: configuring or expecting to receive a point-to-point (PTP) retransmission after a point-to-multipoint (PTM) transmission; configuring or expecting to receive a PTM retransmission after the PTM transmission; configuring or expecting to receive the PTP retransmission and the PTM retransmission after the PTM transmission; and configuring or expecting the PTP retransmission after a PTP transmission. If the MAC entity is in active time for the G-RNTI or the G-CS-RNTI, then the PDCCH is monitored for the G-RNTI or the G-CS-RNTI.

A second method disclosed herein for managing HARQ transmission in a wireless communication network, when a HARQ feedback is at least one of: not configured, not enabled, or is disabled, comprises receiving, by a UE, at least one of: a physical downlink control channel (PDCCH) that indicates a downlink (DL) multicast transmission for a group radio network temporary identifier (G-RNTI) or a group configured scheduling radio network temporary identifier (G-CS-RNTI) or a cell-RNTI (C-RNTI) or a CS-RNTI; and a configured DL multicast assignment for the G-RNTI or the G-CS-RNTI, wherein a medium access control (MAC) protocol data unit (PDU) is received in the configured DL multicast assignment. In the second method, a plurality of DRX HARQ RTT timers are not started when the HARQ feedback is at least one of: not configured, not enabled, or is disabled.

The second method further comprises, performing, by a MAC entity, one of the following:

a. starting a first HARQ RTT timer (drx-HARQ-RTT-TimerDL timer) for a corresponding HARQ process in the first symbol after the end of a supposed corresponding transmission carrying the DL HARQ feedback after a PTM transmission and if a PTP retransmission is expected or configured, and stopping a drx-RetransmissionTimerDL timer for the corresponding HARQ process;
b. starting a second HARQ RTT timer (drx-HARQ-RTT-TimerMBS timer) for the corresponding HARQ process in the first symbol after the end of the supposed corresponding transmission carrying the DL HARQ feedback after the PTM transmission and if a PTM retransmission is expected or configured, and stopping, by the MAC entity, a drx-RetransmissionTimerMBS timer for the corresponding HARQ process; and
c. starting the drx-HARQ-RTT-TimerDL timer and the drx-HARQ-RTT-TimerMBS timer in the first symbol after the end of the supposed corresponding transmission carrying the DL HARQ feedback after the PTM transmission and if the PTP retransmission and the PTM retransmission are expected or configured, and stopping the drx-RetransmissionTimerDL timer and the drx-RetransmissionTimerMBS timer for the corresponding HARQ process.

The second method further comprises starting the drx-RetransmissionTimerDL timer for the corresponding HARQ process in the first symbol after the expiry of the drx-HARQ-RTT-TimerDL timer if there is an unsuccessful decoding of the data of the corresponding HARQ process. The second method further comprises starting the drx-Retransmission-TimerMBS timer for the corresponding HARQ process in the first symbol after the expiry of the drx-HARQ-RTT-TimerMBS timer if there is an unsuccessful decoding of the data of the corresponding HARQ process.

The second method may further comprise performing, by a MAC entity, one of the following:

a. starting a first HARQ RTT timer (drx-HARQ-RTT-TimerDL timer) for a corresponding HARQ process after a PTM transmission and if a PTP retransmission is expected or configured, and stopping a drx-RetransmissionTimerDL timer for the corresponding HARQ process;
b. starting a second HARQ RTT timer (drx-HARQ-RTT-TimerMBS timer) for the corresponding HARQ process after the PTM transmission and if a PTM retransmission is expected or configured, and stopping a drx-RetransmissionTimerMBS timer for the corresponding HARQ process; and
c. starting the drx-HARQ-RTT-TimerDL timer and the drx-HARQ-RTT-TimerMBS timer for the corresponding HARQ process after the PTM transmission and if the PTP retransmission and the PTM retransmission are expected or configured, and stopping the drx-RetransmissionTimerDL timer and the drx-Retransmission-TimerMBS timer for the corresponding HARQ process.

The second method further comprises starting the drx-RetransmissionTimerDL timer for the corresponding HARQ process in the first symbol after the expiry of the drx-HARQ-RTT-TimerDL timer if there is an unsuccessful decoding of the data of the corresponding HARQ process. The second method further comprises starting the drx-Retransmission-TimerMBS timer for the corresponding HARQ process in the first symbol after the expiry of the drx-HARQ-RTT-TimerMBS timer if there is an unsuccessful decoding of the data of the corresponding HARQ process.

The second method may further comprise performing, by a MAC entity, one of the following:

a. starting a third HARQ RTT timer (drx-HARQ-RTT-TimerDL2 timer) for a corresponding HARQ process after a PTM transmission and if a PTP retransmission is expected or configured, and stopping a drx-RetransmissionTimerDL timer for the corresponding HARQ process;
b. starting a second HARQ RTT timer (drx-HARQ-RTT-TimerMBS timer) for the corresponding HARQ process after the PTM transmission and if a PTM retransmission is expected or configured, and stopping, by the MAC entity, a drx-RetransmissionTimerMBS timer for the corresponding HARQ process; and
c. starting the drx-HARQ-RTT-TimerDL2 timer and the drx-HARQ-RTT-TimerMBS timer for the corresponding HARQ process after the PTM transmission and if the PTP retransmission and the PTM retransmission are expected or configured, and stopping, by the MAC entity, the drx-RetransmissionTimerDL timer and the drx-RetransmissionTimerMBS timer for the corresponding HARQ process.

The second method further comprises starting the drx-RetransmissionTimerDL timer for the corresponding HARQ process in the first symbol after the expiry of the drx-HARQ-RTT-TimerDL2 timer if there is an unsuccessful decoding of the data of the corresponding HARQ process. The second method further comprises starting the drx-Retransmission-TimerMBS timer for the corresponding HARQ process in the first symbol after the expiry of the drx-HARQ-RTT-TimerMBS timer if there is an unsuccessful decoding of the data of the corresponding HARQ process.

The second method may further comprise performing, by a MAC entity, one of the following:

a. stopping a drx-RetransmissionTimerDL timer for a corresponding HARQ process after a PTM transmission and if a PTP retransmission is configured or expected, and starting the drx-RetransmissionTimerDL timer for the corresponding HARQ process in the first symbol after the end of a supposed corresponding transmission carrying the DL HARQ feedback
b. stopping a drx-RetransmissionTimerMBS timer for the corresponding HARQ process after the PTM transmission and if a PTM retransmission is configured or expected, and starting a drx-RetransmissionTimerMBS timer for the corresponding HARQ process in the first symbol after the end of the supposed corresponding transmission carrying the DL HARQ feedback; and
c. stopping the drx-RetransmissionTimerDL timer and the drx-RetransmissionTimerMBS timer for the corresponding HARQ process after the PTM transmission and if the PTP retransmission and the PTM retransmission are expected or configured, and starting the drx-RetransmissionTimerDL timer and the drx-RetransmissionTimerMBS timer for the corresponding HARQ process in the first symbol after the end of the supposed corresponding transmission carrying the DL HARQ feedback.

The second method may further comprise, performing, by a MAC entity, one of the following:

a. starting a drx-RetransmissionTimerDL timer for a corresponding HARQ process after a PTM transmission and if a PTP retransmission is expected or configured;
b. starting a drx-RetransmissionTimerMBS timer for the corresponding HARQ process after the PTM transmission and if a PTM retransmission is expected or configured; and
c. starting the drx-RetransmissionTimerDL timer and the drx-RetransmissionTimerMBS timer for the corresponding HARQ process after the PTM transmission and if the PTP retransmission and the PTM retransmission are expected or configured.

A third method disclosed herein for managing HARQ retransmission in a wireless communication network when at least one of the following occurs: an unsuccessful decoding of the data of the corresponding HARQ process, and feedback for the corresponding HARQ process is not acknowledgement (ACK), comprises receiving, by the UE, at least one of: a physical downlink control channel (PDCCH) that indicates a DL multicast transmission for a group radio network temporary identifier (G-RNTI) or a group configured scheduling radio network temporary identifier (G-CS-RNTI) or a cell-RNTI (C-RNTI) or a CS-RNTI; and a configured DL multicast assignment for the G-RNTI or the G-CS-RNTI, wherein a medium access control (MAC) protocol data unit (PDU) is received in the configured DL multicast assignment. The HARQ feedback is at least one of: configured, enabled, not disabled, allowed for transmission, or transmitted. The MAC entity may skip to start any DRX HARQ RTT timers if there is no HARQ feedback transmission because of ACK in case of negative acknowledgement (NACK) only HARQ feedback configuration.

The third method further comprises performing, by a MAC entity, one of the following:

a. starting a drx-HARQ-RTT-TimerDL timer for a corresponding HARQ process in the first symbol after the end of a corresponding transmission carrying the DL HARQ feedback after a PTM transmission and if a PTP retransmission is expected or configured, and stopping a drx-RetransmissionTimerDL timer for the corresponding HARQ process;
b. starting a drx-HARQ-RTT-TimerMBS timer for the corresponding HARQ process in the first symbol after the end of the corresponding transmission carrying the DL HARQ feedback after the PTM transmission and if a PTM retransmission is expected or configured, and stopping a drx-RetransmissionTimerMBS timer for the corresponding HARQ process; and
c. starting the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and the PTM retransmission are expected or configured, and stopping the drx-RetransmissionTimerDL timer and the drx-Retransmission-TimerMBS timer for the corresponding HARQ process.

The third method further comprises starting the drx-RetransmissionTimerDL timer for the corresponding HARQ process in the first symbol after the expiry of the drx-HARQ-RTT-TimerDL timer if there is an unsuccessful decoding of the data of the corresponding HARQ process. The third method further comprises starting the drx-Retransmission-TimerMBS timer for the corresponding HARQ process in the first symbol after the expiry of the drx-HARQ-RTT-TimerMBS timer if there is an unsuccessful decoding of the data of the corresponding HARQ process.

A fourth method disclosed herein for managing feedback-less HARQ retransmission, in a wireless communication network, when it is supported for broadcast services comprises receiving, by the UE, a physical downlink control channel (PDCCH) that indicates a DL transmission for a group radio network temporary identifier (G-RNTI) or a group configured scheduling radio network temporary identifier (G-CS-RNTI). The fourth method further comprises determining, by the UE, at least one of the following: a HARQ feedback is not configured; and the feedback-less HARQ retransmission is configured or is applied. In the fourth method, a plurality of DRX HARQ RTT and DRX ReTx timers are not configured.

The fourth method further comprises starting, by a medium access control (MAC) entity, a drx-HARQ-RTT-TimerMBS timer for a corresponding HARQ process after a PTM transmission and if a PTM retransmission is expected or configured. The fourth method further comprises stopping, by the MAC entity, a drx-RetransmissionTimerMBS timer for the corresponding HARQ process. The drx-RetransmissionTimerMBS timer for the corresponding HARQ process is started in the first symbol after the expiry of the drx-HARQ-RTT-TimerMBS timer if there is an unsuccessful decoding of the data of the corresponding HARQ process.

If the PDCCH indicates the DL transmission for the G-RNTI or the G-CS-RNTI, the fourth method further comprises starting, by the MAC entity, a drx-HARQ-RTT-TimerMBS timer for a corresponding HARQ process in the first symbol after the end of a supposed corresponding transmission carrying a DL HARQ feedback after a PTM transmission and if a PTM retransmission is expected or configured. The fourth method further comprises stopping, by the MAC entity, a drx-RetransmissionTimerMBS timer for the corresponding HARQ process. The fourth method further comprises starting the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If the drx-HARQ-RTT-TimerMBS timer is not configured, then the drx-RetransmissionTimerMBS timer for the corresponding HARQ process is started after a PTM transmission and if a PTM retransmission is expected or configured.

If the PDCCH indicates the DL transmission for the G-RNTI or the G-CS-RNTI, wherein a drx-HARQ-RTT-TimerMBS timer is not configured, and wherein there is a PTM transmission, and a PTM retransmission is expected or configured, the fourth method further comprises stopping by the MAC entity, a drx-RetransmissionTimerMBS timer for a corresponding HARQ process. The fourth method further comprises starting, by the MAC entity, the drx-RetransmissionTimerMBS timer for the corresponding HARQ process in the first symbol after the end of a supposed corresponding transmission carrying a DL HARQ feedback.

A fifth method disclosed herein for managing multicast service reception in one of a radio resource control (RRC) idle state, a RRC inactive state, or a combination of the RRC idle state and the RRC inactive state, in a wireless communication network, comprises receiving, by a UE, at least one of: a physical downlink control channel (PDCCH) that indicates a downlink (DL) multicast transmission for a group radio network temporary identifier (G-RNTI) or a group configured scheduling radio network temporary identifier (G-CS-RNTI) or a cell-RNTI (C-RNTI) or a CS-RNTI; and a configured DL multicast assignment for the G-RNTI or the G-CS-RNTI, wherein a medium access control (MAC) protocol data unit (PDU) is received in the configured DL multicast assignment. The fifth method further comprises determining, by the UE, at least one of the following: a feedback-less hybrid automatic repeat request (HARQ) retransmission is configured or is applied; and a HARQ feedback is not configured.

In the fifth method, for the RRC inactive state, a plurality of DRX HARQ RTT timers and ReTx timers are not configured.

The fifth method may further comprise, if there is a change in the RRC state for multicast service reception, through dedicated signaling, the UE may be provided with the configuration of at least one of the following; a plurality of DRX timers, and a HARQ feedback mode or transmission approach.

The fifth method may further comprise starting, by a MAC entity, a drx-HARQ-RTT-TimerMBS timer for a corresponding HARQ process after a PTM transmission and if a PTM retransmission is expected or configured. The fifth method may further comprise stopping, by the MAC entity, a drx-RetransmissionTimerMBS timer for the corresponding HARQ process. The fifth method may further comprise starting, by the MAC entity, the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If the PDCCH indicates the DL multicast transmission for the G-RNTI or the G-CS-RNTI, the fifth method may further comprise starting, by a MAC entity, a drx-HARQ-RTT-TimerMBS timer for a corresponding HARQ process in the first symbol after the end of a supposed corresponding transmission carrying a DL HARQ feedback after a PTM transmission and if a PTM retransmission is expected or configured. The fifth method may further comprise stopping, by the MAC entity, a drx-RetransmissionTimerMBS timer for the corresponding HARQ process. The fifth method may further comprise starting, by the MAC entity, the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If the drx-HARQ-RTT-TimerMBS timer is not configured, then the drx-RetransmissionTimerMBS timer for the corresponding HARQ process is started after a PTM transmission and if a PTM retransmission is expected or configured.

If the PDCCH indicates the DL multicast transmission for the G-RNTI or the G-CS-RNTI, if the drx-HARQ-RTT-TimerMBS timer is not configured, and if there is a PTM transmission and PTM retransmission is expected or configured, then the fifth method further comprises stopping, by a MAC entity, a drx-RetransmissionTimerMBS timer for a corresponding HARQ process. The fifth method further comprises starting, by the MAC entity (20), the drx-RetransmissionTimerMBS timer for the corresponding HARQ process in the first symbol after the end of a supposed corresponding transmission carrying a DL HARQ feedback.

A sixth method disclosed herein for managing one or more HARQ buffers comprises undertaking, by a UE that comprises one or more MAC entities, at least one of: the one or more HARQ buffers and one or more HARQ processes. The method further includes performing, by the UE, an initialization, a clearing, or a flushing of the one or more HARQ buffers when at least one of the following occurs: a new data assignment is received by the UE; an activation command is received by the UE for a PTM radio link control (RLC) bearer or leg; a deactivation command is received by the UE for the PTM RLC bearer or leg; a bearer mode change; a starting or an ending of a MBS session; a handover, a cell reselection or a combination of the handover and the cell reselection; a switching between the PTM delivery mode, PTP delivery mode, or a combination of the PTM and PTP delivery modes; a dedicated signaling, a group notification, or a combination of the dedicated signaling and the group notification is received by the UE, and the MBS session is configured or activated or deactivated or released; a break in a service or a coverage; a retransmission count is equal to or greater than a maximum retransmission count; receipt of at least one of: a configuration, a reconfiguration, and a modification for at least one of a plurality of DRX timers and parameters, a HARQ feedback mode, a HARQ retransmission configuration, and the maximum retransmission count; a change in the RRC state; a group notification for a multicast session activation, deactivation, configuration change indication, starting, stopping, or release; and a wake-up-signal (WUS) status indicates no PDCCH allocation for a subsequent DRX cycle and there is pending of data in a DL HARQ buffer to be successfully decoded.

If there is PTM initial transmission, a PTM retransmission and a PTP retransmission, at least one of the one or more HARQ buffers, the one or more HARQ processes, and one or more HARQ process identities are shared across a PTM reception, a PTP reception, and a unicast reception. In the sixth method, a logical channel identity of a received MBS packet is used to distinguish between the PTP reception and the PTP reception and the unicast reception.

In the sixth method, the configuration of the HARQ retransmission, the HARQ feedback mode, one or more HARQ RTT timers, one or more HARQ retransmission timers, and the maximum retransmission count are provided along with the configuration or reconfiguration for the PTM bearer.

Accordingly, the embodiments herein provide a system comprising a UE that comprises one or more MAC entities and a DRX module. The DRX module comprises a DRX controller and a plurality of DRX timers.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

The principal object of the embodiments herein is to disclose methods and systems of HARQ retransmission for NR MBS services. Another object of the embodiments herein is to disclose a DRX approach and HARQ transmission and retransmission for MBS packets in order to support power efficient and reliable delivery of 5G MBS services. Another object of the embodiments herein is to disclose a DRX approach and HARQ transmission and retransmission for MBS packets, which work for the PTM and PTP based delivery framework for NR MBS. Advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

FIG. 1*a* illustrates a method for managing the RTT timer after feedback transmission, according to embodiments as disclosed herein.

FIG. 1*b* illustrates a method for managing the RTT timer after feedback transmission, according to embodiments as disclosed herein.

FIG. 1*c* illustrates a method for managing the RTT timer after feedback transmission, according to embodiments as disclosed herein.

FIG. 1*d* illustrates a method for managing the RTT timer after feedback transmission, according to embodiments as disclosed herein.

FIG. 2*a* illustrates a method for HARQ transmission when multicast DRX for the G-RNTI or the G-CS-RNTI are configured, according to embodiments as disclosed herein.

FIG. 2*b* illustrates a method for HARQ transmission when multicast DRX for the G-RNTI or the G-CS-RNTI are configured, according to embodiments as disclosed herein.

FIG. 2*c* illustrates a method for HARQ transmission when multicast DRX for the G-RNTI or the G-CS-RNTI are configured, according to embodiments as disclosed herein.

FIG. 2*d* illustrates a method for HARQ transmission when multicast DRX for the G-RNTI or the G-CS-RNTI are configured, according to embodiments as disclosed herein.
FIG. 3*a* illustrates a method for managing for managing HARQ transmission when a HARQ feedback is at least one of: not configured, not enabled, or is disabled, according to embodiments as disclosed herein.

Figure 3D:
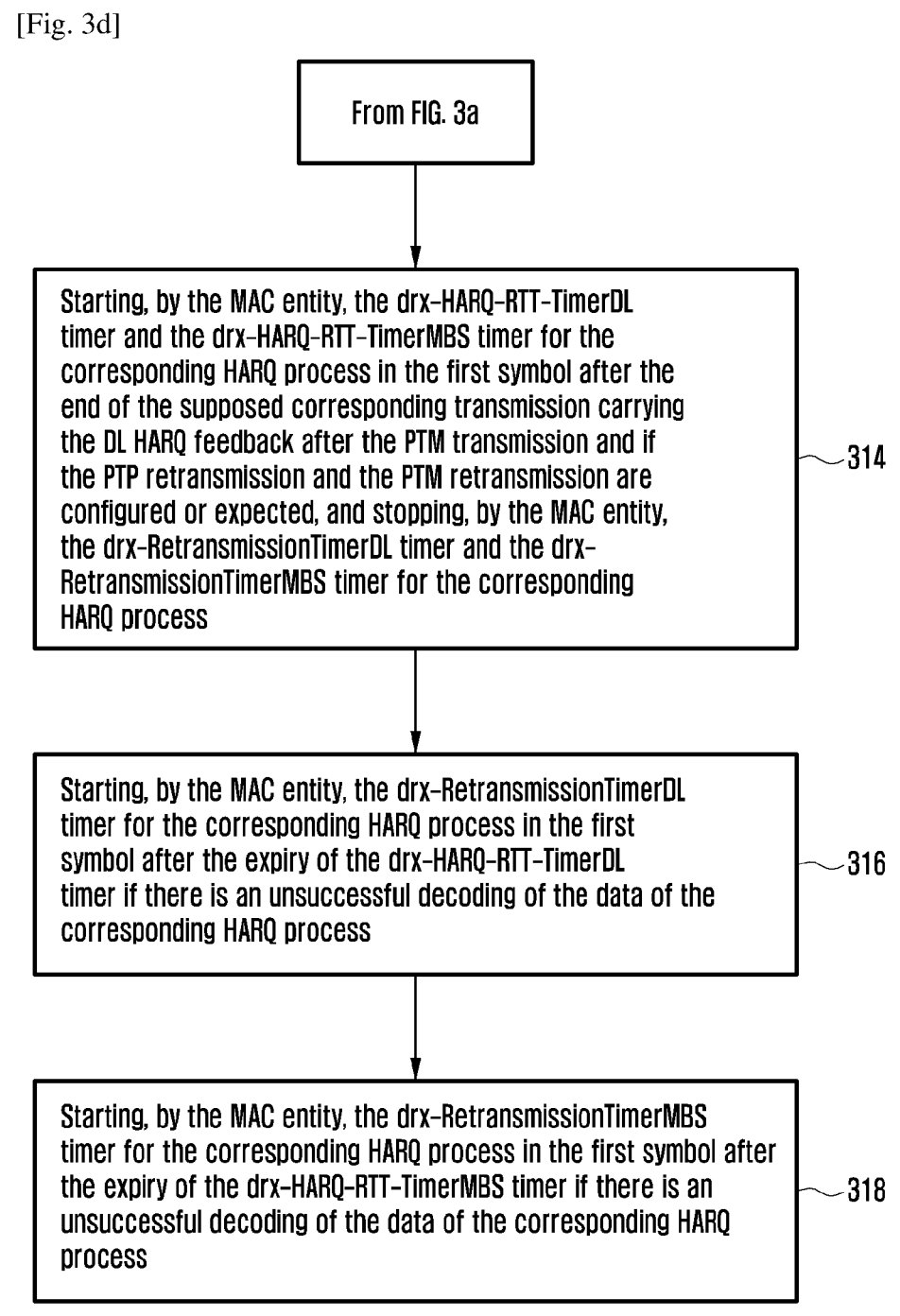

FIG. 3*a* illustrates a method for managing for managing HARQ transmission when a HARQ feedback is at least one of: not configured, not enabled, or is disabled, according to embodiments as disclosed herein.

FIG. 3*b* illustrates a method for managing for managing HARQ transmission when a HARQ feedback is at least one of: not configured, not enabled, or is disabled, according to embodiments as disclosed herein.

FIG. 3*c* illustrates a method for managing for managing HARQ transmission when a HARQ feedback is at least one of: not configured, not enabled, or is disabled, according to embodiments as disclosed herein.

FIG. 3*d* illustrates a method for managing for managing HARQ transmission when a HARQ feedback is at least one of: not configured, not enabled, or is disabled, according to embodiments as disclosed herein.

FIG. 4*a* illustrates a method for managing a first and second RTT timer, according to embodiments as disclosed herein.

FIG. 4*b* illustrates a method for managing a first and second RTT timer, according to embodiments as disclosed herein.

FIG. 4*c* illustrates a method for managing a first and second RTT timer, according to embodiments as disclosed herein.

FIG. 4*d* illustrates a method for managing a first and second RTT timer, according to embodiments as disclosed herein.

Figure 5C:
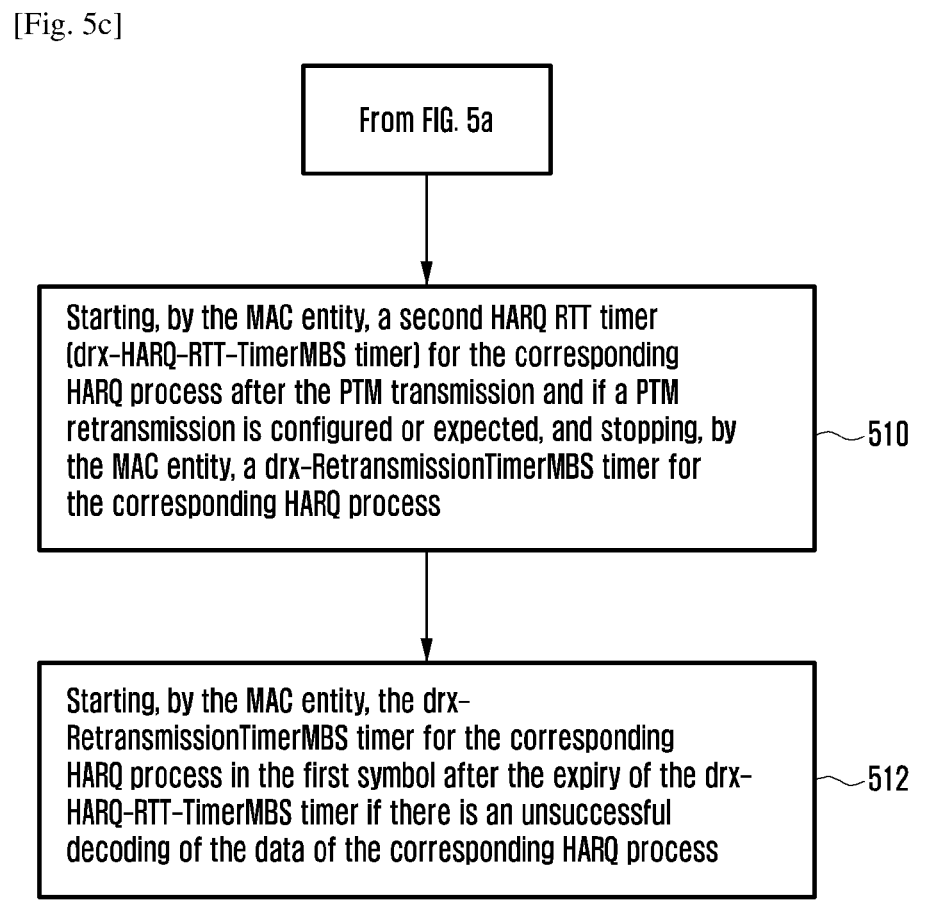

FIG. 5*a* illustrates a method for managing a third RTT timer, according to embodiments as disclosed herein.

FIG. 5*b* illustrates a method for managing a third RTT timer, according to embodiments as disclosed herein.

FIG. 5*c* illustrates a method for managing a third RTT timer, according to embodiments as disclosed herein.

FIG. 5*d* illustrates a method for managing a third RTT timer, according to embodiments as disclosed herein.

FIG. 6 illustrates a method for managing the ReTx timer after the supposed timing of the feedback transmission, according to embodiments as disclosed herein.

FIG. 7 illustrates a method for managing the Re-Tx timer after receiving an assignment, according to embodiments as disclosed herein.

FIG. 8*a* illustrates a method for starting a RTT when there is at least one of a unsuccessful decoding of the data of a corresponding HARQ process and feedback for the corresponding HARQ process is not ACK, according to embodiments as disclosed herein.

FIG. 8*b* illustrates a method for starting a RTT when there is at least one of a unsuccessful decoding of the data of a corresponding HARQ process and feedback for the corresponding HARQ process is not ACK, according to embodiments as disclosed herein.

FIG. 8*c* illustrates a method for starting a RTT when there is at least one of a unsuccessful decoding of the data of a corresponding HARQ process and feedback for the corresponding HARQ process is not ACK, according to embodiments as disclosed herein.

FIG. 8*d* illustrates a method for starting a RTT when there is at least one of a unsuccessful decoding of the data of a corresponding HARQ process and feedback for the corresponding HARQ process is not ACK, according to embodiments as disclosed herein.

FIG. 9 illustrates a method for managing HARQ retransmission in a wireless communication network when it is supposed for broadcast services, according to embodiments as disclosed herein.

FIG. 10 illustrates a method for managing HARQ retransmission in a wireless communication network when it is supported for broadcast services when the PDCCH indicates DL transmission for the G-RNTI or the G-CS-RNTI, according to embodiments as disclosed herein.

FIG. 11 illustrates a method for managing HARQ retransmission when the PDCCH indicates the DL transmission for the G-RNTI or the G-CS-RNTI and the RTT timer is not configured, according to embodiments as disclosed herein.

FIG. 12 illustrates a method for managing multicast service reception in one of a RRC idle state, a RRC inactive state, or a combination of the RRC idle state and the RRC inactive state, according to embodiments as disclosed herein.

FIG. 13 illustrates a method for managing multicast service reception when the PDCCH indicates the DL multicast transmission for the G-RNTI or the G-CS-RNTI, according to embodiments as disclosed herein.

FIG. 14 illustrates a method for managing multicast service reception when the PDCCH indicates the DL transmission for the G-RNTI or the G-CS-RNTI and the RTT timer is not configured, according to embodiments as disclosed herein.

FIG. 15 illustrates a system for enabling HARQ retransmission for NR MBS, according to embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems of HARQ retransmission for NR MBS services. Embodiments herein disclose a DRX approach and HARQ transmission and retransmission for MBS packets in order to support power efficient and reliable delivery of 5G MBS services. Embodiments herein disclose a DRX approach and HARQ transmission and retransmission for MBS packets, which work for the PTM and PTP based delivery framework for NR MBS.

Embodiments herein consider (existing) UE specific unicast DRX and (newly defined) group common service specific MBS DRX.

Each DRX has its own parameters and timers

After initial PTM (addressed by G-RNTI or G-CS-RNTI) HARQ transmission, PTP (addressed by C-RNTI or CS-RNTI) HARQ retransmission can be performed. PTM HARQ retransmission is also possible.

ReTx Timers' Operation

For efficient DRX operation, the UE can configure which retransmission (ReTx) is used:

Only PTP ReTx may be expected (after transmission on PTM).

Only PTM ReTx may be expected (after transmission on PTM).

Both PTP ReTx and PTM ReTx may be expected (after transmission on PTM).

Only PTP ReTx may be expected (after transmission on PTP).

No ReTx is expected.

In the embodiments disclosed herein, the term "transmission" may refer to the initial transmission, or it may also refer to a subsequent transmission in case multiple retransmissions of the same multicast transport block (TB) are considered.

Embodiments herein consider MBS DRX timers for PTM that can include, but are not limited to, drx-onDurationTimerMBS timer, drx-InactivityTimerMBS timer, drx-RetransmissionTimerMBS timer, and drx-HARQ-RTT-TimerMBS timer. In another embodiment, these MBS DRX timers can also be referred to with alternative terms such as drx-onDurationTimerPTM timer, drx-InactivityTimerPTM timer, drx-RetransmissionTimerDL-PTM timer, and drx-HARQ-RTT-TimerDL-PTM timer, respectively. The MBS PTP DRX timers can include, but are not limited to, drx-onDurationTimer timer, drx-InactivityTimer timer, drx-RetransmissionTimerDL timer, and drx-HARQ-RTT-TimerDL timer.

Approach 1: Starting RTT Timer after Feedback Transmission

When only PTP ReTx (after transmission on PTM) is expected or configured:

If the physical downlink control channel (PDCCH), received by a UE, indicates a DL multicast transmission for a group radio network temporary identifier (G-RNTI) or a group configured scheduling radio network temporary identifier (G-CS-RNTI) or a cell-RNTI (C-RNTI) or a CS-RNTI; and If a configured DL multicast assignment for the G-RNTI or the G-CS-RNTI is received by the UE, wherein a medium access control (MAC) protocol data unit (PDU) is received in the configured DL assignment, a medium access control (MAC) entity may:

>When the HARQ feedback is configured; or

>When the HARQ feedback is enabled or is not disabled; or

>When the HARQ feedback is allowed for transmission; or

>When the HARQ feedback is actually transmitted start a drx-HARQ-RTT-TimerDL timer for a corresponding HARQ process in the first symbol after the end of a corresponding transmission carrying a DL HARQ feedback; and stop a drx-RetransmissionTimerDL timer for the corresponding HARQ process.

If the drx-HARQ-RTT-TimerDL timer has expired and the data of the corresponding HARQ process was not successfully decoded, the MAC entity may:

start the drx-RetransmissionTimerDL timer for the corresponding HARQ process in the first symbol after the expiry of the drx-HARQ-RTT-TimerDL timer.

When only PTM ReTx (after transmission on PTM) is expected or configured:

If the PDCCH, received by a UE, indicates a DL multicast transmission for the G-RNTI or the G-CS-RNTI the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is configured; or

>When the HARQ feedback is enabled or is not disabled; or

>When the HARQ feedback is allowed for transmission; or

>When the HARQ feedback is actually transmitted start a drx-HARQ-RTT-TimerMBS timer for the corresponding HARQ process in the first symbol after the end of the corresponding transmission carrying the DL HARQ feedback; and stop a drx-RetransmissionTimerMBS timer for the corresponding HARQ process.

If the drx-HARQ-RTT-TimerMBS timer has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

When both PTM ReTx and PTP ReTx (after transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is configured; or

>When the HARQ feedback is enabled or is not disabled; or

>When the HARQ feedback is allowed for transmission; or

>When the HARQ feedback is actually transmitted start the drx-HARQ-RTT-TimerDL timer for the corresponding HARQ process in the first symbol after the end of the corresponding transmission carrying the DL HARQ feedback;

stop the drx-RetransmissionTimerDL timer for the corresponding HARQ process;

start the drx-HARQ-RTT-TimerMBS timer for the corresponding HARQ process in the first symbol after the end of the corresponding transmission carrying the DL HARQ feedback; and stop the drx-RetransmissionTimerMBS timer for the corresponding HARQ process If the drx-HARQ-RTT-TimerDL timer has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerDL timer.

If the drx-HARQ-RTT-TimerMBS timer has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

In some embodiments for approach 1, the PDDCH may indicate the DL multicast transmission for the G-RNTI or the G-CS-RNTI, and the HARQ feedback may be enabled.

In other embodiments for approach 1, the multicast discontinuous reception (DRX) may be configured for the G-RNTI or the G-CS-RNTI. A medium access control (MAC) protocol data unit (PDU) may also be received in the configured DL multicast assignment, and the HARQ feedback may be enabled.

If the MAC entity is in active time for the G-RNTI or the G-CS-RNTI, then the PDCCH may be monitored for the G-RNTI or the G-CS-RNTI.

If the PDCCH indicates a DL multicast transmission and if HARQ feedback is at least one of: configured, is enabled or is not disabled, is allowed for transmission, or is actually transmitted, then:

>start the drx-HARQ-RTT-TimerDL timer for the corresponding HARQ process in the first symbol after the end of the corresponding transmission carrying the DL HARQ feedback;

>start the drx-HARQ-RTT-TimerMBS timer for the corresponding HARQ process in the first symbol after the end of the corresponding transmission carrying the DL HARQ feedback;

>stop the drx-RetransmissionTimerDL timer for the corresponding HARQ process; and >stop the drx-RetransmissionTimerMBS timer for the corresponding HARQ process.

If the drx-HARQ-RTT-TimerDL timer has expired and the data of the corresponding HARQ process was not successfully decoded, the MAC entity:

>start the drx-RetransmissionTimerDL timer for the corresponding HARQ process in the first symbol after the expiry of the drx-HARQ-RTT-TimerDL timer.

If the drx-HARQ-RTT-TimerMBS timer has expired and the data of the corresponding HARQ process was not successfully decoded, the MAC entity:

>start the drx-RetransmissionTimerMBS timer for the corresponding HARQ process in the first symbol after the expiry of the drx-HARQ-RTT-TimerMBS timer.

Approach 2: Starting Round Trip Time (RTT) Timer after the Supposed Timing of Feedback Transmission When only PTP ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., the MBS physical uplink control channel (PUCCH) conflicts with the unicast PUCCH, Timing Alignment timer expiry)

start the drx-HARQ-RTT-TimerDL timer for the corresponding HARQ process in the first symbol after the end of what would supposedly be the corresponding transmission carrying the DL HARQ feedback (i.e. no feedback but there may be consideration on what the feedback transmission timing would be, for example the PUCCH timing may be configured despite feedback not being transmitted as HARQ feedback may be dynamically disabled or enabled, whereas PUCCH configuration may be statically configured and be present even when HARQ feedback is disabled); and stop the drx-RetransmissionTimerDL timer for the corresponding HARQ process.

If the drx-HARQ-RTT-TimerDL has expired and the data of the corresponding HARQ process was not successfully decoded, the MAC entity may:

>start the drx-RetransmissionTimerDL timer for the corresponding HARQ process in the first symbol after the expiry of drx-HARQ-RTT-TimerDL timer.

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerMBS timer for the corresponding HARQ process in the first symbol after the end of what would supposedly be the corresponding transmission carrying the DL HARQ feedback; (i.e. no feedback but there may be consideration on what the feedback transmission timing would be); and stop the drx-RetransmissionTimerMBS timer for the corresponding HARQ process.

If the drx-HARQ-RTT-TimerMBS has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

When both the PTM ReTx and the PTP ReTx (after transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerDL timer for the corresponding HARQ process in the first symbol after the end of what would supposedly be the corresponding transmission carrying the DL HARQ feedback; (i.e. no feedback but there may be consideration on what the feedback transmission timing would be);

stop the drx-RetransmissionTimerDL timer for the corresponding HARQ process;

start the drx-HARQ-RTT-TimerMBS timer for the corresponding HARQ process in the first symbol after the end of what would supposedly be the corresponding transmission carrying the DL HARQ feedback; (i.e., no feedback but there may be consideration on what the feedback transmission timing would be); and stop the drx-RetransmissionTimerMBS timer for the corresponding HARQ process.

If the drx-HARQ-RTT-TimerDL has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerMBS timer.

If the drx-HARQ-RTT-TimerMBS has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

When the HARQ feedback is disabled or not enabled or not configured, a plurality of discontinuous reception (DRX) HARQ round trip time (RTT) timers may not be started.

Approach 3: Starting a First and/or a Second RTT Timer after Receiving Assignment When only PTP ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerDL (also referred to herein as "first RTT timer") timer for the corresponding HARQ process; and stop the drx-RetransmissionTimerDL timer for the corresponding HARQ process.

If the drx-HARQ-RTT-TimerDL timer has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerDL timer.

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured, or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with the unicast PUCCH, Timing Alignment timer expiry)

start the drx-HARQ-RTT-TimerMBS (also referred to herein as "second RTT timer") timer for the corresponding HARQ process; and stop the drx-RetransmissionTimerMBS timer for the corresponding HARQ process.

If the drx-HARQ-RTT-TimerMBS timer has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

When both the PTM ReTx and the PTP ReTx (after initial transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerDL timer for the corresponding HARQ process;

stop the drx-RetransmissionTimerDL timer for the corresponding HARQ process;

start the drx-HARQ-RTT-TimerMBS timer for the corresponding HARQ process; and stop the drx-RetransmissionTimerMBS timer for the corresponding HARQ process.

If the drx-HARQ-RTT-TimerDL timer has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerDL timer.

If the drx-HARQ-RTT-TimerMBS timer has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

Approach 3B: Starting a Third RTT Timer after Receiving Assignment

A drx-HARQ-RTT-TimerDL2 timer (also referred to herein as "third HARQ RTT timer") may be additionally defined to start the unicast DRX timer after the MBS transmission. The length of the drx-HARQ-RTT-TimerDL2 timer may be longer than the drx-HARQ-RTT-TimerDL timer by considering the (virtual) HARQ feedback time.

When only PTP ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerDL2 timer for the corresponding HARQ process; and stop the drx-RetransmissionTimerDL timer for the corresponding HARQ process.

If the drx-HARQ-RTT-TimerDL2 has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerDL timer.

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerMBS timer for the corresponding HARQ process; and stop the drx-RetransmissionTimerMBS timer for the corresponding HARQ process.

If the drx-HARQ-RTT-TimerMBS timer has expired and the data of the corresponding HARQ process was not successfully decoded, the MAC entity may.

>start the drx-RetransmissionTimerMBS timer for the corresponding HARQ process in the first symbol after the expiry of the drx-HARQ-RTT-TimerMBS timer.

When both the PTM ReTx and the PTP ReTx (after initial transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-HARQ-RTT-TimerDL2 timer for the corresponding HARQ process;

stop the drx-RetransmissionTimerDL timer for the corresponding HARQ process;

start the drx-HARQ-RTT-TimerMBS timer for the corresponding HARQ process; and stop the drx-RetransmissionTimerMBS timer for the corresponding HARQ process.

If the drx-HARQ-RTT-TimerDL2 has expired and the data of the corresponding HARQ process was not successfully decoded, the MAC entity may:

>start the drx-RetransmissionTimerDL timer for the corresponding HARQ process in the first symbol after the expiry of the drx-HARQ-RTT-TimerDL timer.

If the drx-HARQ-RTT-TimerMBS timer has expired and the data of the corresponding HARQ process was not successfully decoded, the MAC entity may:

>start the drx-RetransmissionTimerMBS timer for the corresponding HARQ process in the first symbol after the expiry of the drx-HARQ-RTT-TimerMBS timer.

Approach 4: Starting Only ReTx Timer after the Supposed Timing of Feedback Transmission When only the PTP ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

stop the drx-RetransmissionTimerDL timer for the corresponding HARQ process; and start the drx-RetransmissionTimerDL timer for the corresponding HARQ process in the first symbol after the end of what would supposedly be the corresponding transmission carrying the DL HARQ feedback; (i.e., no feedback but there may be consideration on what the feedback transmission timing would be).

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., the MBS PUCCH conflicts with the unicast PUCCH, Timing Alignment timer expiry)

stop the drx-RetransmissionTimerMBS timer for the corresponding HARQ process; and start the drx-RetransmissionTimerMBS timer for the corresponding HARQ process in the first symbol after the end of what would supposedly be the corresponding transmission carrying the DL HARQ feedback; (i.e., no feedback but there may be consideration on what the feedback transmission timing would be).

When both the PTM ReTx and the PTP ReTx (after initial transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

stop the drx-RetransmissionTimerDL timer for the corresponding HARQ process;

start the drx-RetransmissionTimerDL timer for the corresponding HARQ process in the first symbol after the end of what would supposedly be the corresponding transmission carrying the DL HARQ feedback; (i.e., no feedback but there may be consideration on what the feedback transmission timing would be);

stop the drx-RetransmissionTimerMBS timer for the corresponding HARQ process; and start the drx-RetransmissionTimerMBS timer for the corresponding HARQ process in the first symbol after the end of what would supposedly be the corresponding transmission carrying the DL HARQ feedback; (i.e., no feedback but there may be consideration on what the feedback transmission timing would be).

Approach 5: Starting Only the ReTx Timer after Receiving Assignment

When only PTP ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-RetransmissionTimerDL timer for the corresponding HARQ process.

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-RetransmissionTimerMBS timer for the corresponding HARQ process.

When both PTM ReTx and PTP ReTx (after transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is not configured; or

>When the HARQ feedback is not enabled or is disabled; or

>When the HARQ feedback is not allowed (e.g., not allowed, low priority etc.); or >When the HARQ feedback is not transmitted (e.g., MBS PUCCH conflicts with unicast PUCCH, Timing Alignment timer expiry)

start the drx-RetransmissionTimerDL timer for the corresponding HARQ process; and start the drx-RetransmissionTimerMBS timer for the corresponding HARQ process.

Approach 6: Starting RTT Timer Only after Decode Fail or No Acknowledgement (ACK)

When only PTP ReTx (after initial transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is configured; or

>When the HARQ feedback is enabled or is not disabled; or

>When the HARQ feedback is allowed for transmission; or

>When the HARQ feedback is actually transmitted

When the data is not decoded successfully and/or feedback is not ACK for corresponding HARQ process:

start the drx-HARQ-RTT-TimerDL timer for the corresponding HARQ process in the first symbol after the end of the corresponding transmission carrying the DL HARQ feedback; and stop the drx-RetransmissionTimerDL timer for the corresponding HARQ process.

If the drx-HARQ-RTT-TimerDL timer has expired and the data of the corresponding HARQ process was not successfully decoded:

>start the drx-RetransmissionTimerDL timer for the corresponding HARQ process in the first symbol after the expiry of the drx-HARQ-RTT-TimerDL timer.

When only PTM ReTx (after transmission on PTM) is expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is configured; or

>When the HARQ feedback is enabled or is not disabled; or

>When the HARQ feedback is allowed for transmission; or

>When the HARQ feedback is actually transmitted

When data is not decoded successfully and/or feedback is not ACK for corresponding HARQ process start the drx-HARQ-RTT-TimerMBS timer for the corresponding HARQ process in the first symbol after the end of the corresponding transmission carrying the DL HARQ feedback; and stop the drx-RetransmissionTimerMBS timer for the corresponding HARQ process.

If the drx-HARQ-RTT-TimerMBS has expired and the data of the corresponding HARQ process was not successfully decoded:

>start the drx-RetransmissionTimerMBS timer for the corresponding HARQ process in the first symbol after the expiry of the drx-HARQ-RTT-TimerMBS timer.

When both the PTM ReTx and the PTP ReTx (after transmission on PTM) are expected or configured:

if the PDCCH, received by the UE, indicates a DL multicast transmission for the G-RNTI or the G-CS-RNTI or the C-RNTI or the CS-RNTI; and if a configured DL multicast assignment for the G-RNTI or the G-CS-RNTI is received by the UE, wherein a MAC PDU is received in the configured DL assignment, the MAC entity may:

>When the HARQ feedback is configured; or

>When the HARQ feedback is enabled or is not disabled; or

>When the HARQ feedback is allowed for transmission; or

>When the HARQ feedback is actually transmitted

When the data is not decoded successfully and/or feedback is not ACK for corresponding HARQ process:

start the drx-HARQ-RTT-TimerDL timer for the corresponding HARQ process in the first symbol after the end of the corresponding transmission carrying the DL HARQ feedback;

stop the drx-RetransmissionTimerDL timer for the corresponding HARQ process;

start the drx-HARQ-RTT-TimerMBS timer for the corresponding HARQ process in the first symbol after the end of the corresponding transmission carrying the DL HARQ feedback; and stop the drx-RetransmissionTimerMBS timer for the corresponding HARQ process.

If the drx-HARQ-RTT-TimerDL timer has expired and the data of the corresponding HARQ process was not successfully decoded:

>start the drx-RetransmissionTimerDL timer for the corresponding HARQ process in the first symbol after the expiry of the drx-HARQ-RTT-TimerDL timer.

If the drx-HARQ-RTT-TimerMBS has expired and the data of the corresponding HARQ process was not successfully decoded:

>start the drx-RetransmissionTimerMBS timer for the corresponding HARQ process in the first symbol after the expiry of the drx-HARQ-RTT-TimerMBS timer.

In an embodiment, no HARQ retransmission is supported for the MBS/multicast services. In this scenario, the PTM drx-HARQ-RTT-TimerMBS timer and/or drx-RetransmissionTimerMBS timer and/or for PTP drx-HARQ-RTT-TimerDL timer and/or drx-RetransmissionTimerDL timer may not be configured or used.

In an embodiment, the MAC entity may skip to start any DRX HARQ RTT timers if there is no HARQ feedback transmission because of ACK in case of NACK (negative acknowledgement) only HARQ feedback configuration.

Approach 7: Semi-Persistent Service (SPS) Scenarios

In an embodiment, for the SPS scenarios wherein a MAC protocol data unit (PDU) is received in a configured downlink assignment for MBS the (i.e., MBS SPS), the operational steps described in approaches 1 to 6 and described for below cases may be applied for one of the following:

Only PTP ReTx is expected or configured;

Only PTM ReTx is expected or configured; and

Both PTP ReTx & PTM ReTx are expected of configured.

Approach 8: Broadcast Services in RRC_IDLE, RRC_INACTIVE or RRC_CONNECTED State

In an embodiment, feed-backless HARQ retransmission is supported for broadcast services in a radio resource control (RRC) idle state, a RRC inactive state, or a RRC connected state.

Solution 8A: Starting RTT Timer after Receiving Assignment

When only PTM ReTx (after transmission on PTM) is expected or configured:

If the PDCCH, received by the UE, indicates a DL transmission for the G-RNTI or the G-CS-RNTI, the MAC entity may >if the HARQ feedback is not configured and/or feedbackless HARQ retransmission is configured:

start the drx-HARQ-RTT-TimerMBS timer for the corresponding HARQ process; and stop the drx-RetransmissionTimerMBS timer for the corresponding HARQ process.

If the drx-HARQ-RTT-TimerMBS has expired and the data of the corresponding HARQ process was not successfully decoded, the MAC entity may:

start the drx-RetransmissionTimerMBS timer for the corresponding HARQ process in the first symbol after the expiry of the drx-HARQ-RTT-TimerMBS timer.

Solution 8B: Starting RTT Timer after the Supposed Timing of Feedback Transmission When only PTM ReTx (after transmission on PTM) is expected or configured:

If the PDCCH, received by the UE, indicates a DL transmission for the G-RNTI or the G-CS-RNTI, the MAC entity may:

>if the HARQ feedback is not configured and/or feedbackless HARQ retransmission is configured start the drx-HARQ-RTT-TimerMBS timer for the corresponding HARQ process in the first symbol after the end of what would supposedly be the corresponding transmission carrying the DL HARQ feedback; (i.e., no feedback but there may be consideration on what the feedback transmission timing would be); and stop the drx-RetransmissionTimerMBS timer for the corresponding HARQ process.

If the drx-HARQ-RTT-TimerMBS timer has expired and the data of the corresponding HARQ process was not successfully decoded:

start the drx-RetransmissionTimerMBS timer for the corresponding HARQ process in the first symbol after the expiry of the drx-HARQ-RTT-TimerMBS timer.

Solution 8C: Starting ReTx Timer after Receiving Assignment

When only PTM ReTx (after transmission on PTM) is expected or configured:

If the PDCCH, received by the UE, indicates a DL multicast transmission for the G-RNTI or the G-CS-RNTI, the MAC entity may:

>if the HARQ feedback is not configured and/or feedbackless HARQ retransmission is configured; and >if the drx-HARQ-RTT-TimerMBS is not configured start the drx-RetransmissionTimerMBS for the corresponding HARQ process Solution 8D: Starting ReTx Timer after the Supposed Timing of Feedback Transmission When only PTM ReTx (after transmission on PTM) is expected or configured:

If the PDCCH, received by the UE, indicates a DL transmission for the G-RNTI or the G-CS-RNTI, the MAC entity may >When the HARQ feedback is not configured and/or feed-backless HARQ retransmission is configured; and >drx-HARQ-RTT-TimerMBS is not configured stop the drx-RetransmissionTimerMBS timer for the corresponding HARQ process; and start the drx-RetransmissionTimerMBS timer for the corresponding HARQ process in the first symbol after the end of what would supposedly be the corresponding transmission carrying the DL HARQ feedback (i.e., no feedback but there may be consideration on what the feedback transmission timing would be).

In an embodiment, no HARQ retransmission may be supported for broadcast services. In this scenario, if the drx-HARQ-RTT-TimerMBS timer is not configured, then the drx-RetransmissionTimerMBS timer for a corresponding HARQ process may be started after a PTM transmission and if a PTM retransmission is expected or configured. In other embodiments, a plurality of DRX HARQ RTT timers and a plurality of DRX ReTx timers may not be configured or may not be used.

Approach 9: Multicast Reception in RRC_IDLE and/or RRC_INACTIVE

In an embodiment, for multicast service reception in RRC_IDLE state and/or RRC_INACTIVE state, at least one of feedback less HARQ retransmission and no HARQ retransmission approach with operational details as described in approach 8 may be utilized/applied.

In an embodiment, when multicast service/session reception is changed from RRC_CONNECTED state to the RRC_IDLE state and/or RRC_INACTIVE state or vice-versa, the configuration for the DRX/HARQ timers and the HARQ feedback mode/retransmission approach may be provided to the UE and/or is indicated to the UE through dedicated signaling (e.g. RRC reconfiguration, group notification message, activation and/or deactivation message, MAC signaling etc.). Further, at least one of the approaches and/or a possible combination of approaches as described by the embodiments disclosed herein can be utilized by the UE for the multicast reception in RRC_IDLE state and/or RRC_INACTIVE state.

Approach 10: Transition Across RRC States and HARQ Feedback Modes

In an embodiment, for broadcast service reception and/or multicast service reception during transitions across RRC states (RRC_IDLE, RRC_INACTIVE, RRC_CONNECTED) and/or during reconfiguration of HARQ feedback modes (HARQ feedback mode, feedback-less HARQ ReTx mode, no HARQ ReTx mode), the UE may switch between the earlier described approaches.

Further, the UE may be configured with different configurations per MBS service or per-UE basis, where all MBS (at least all multicast and/or all broadcast) may have the same configuration with respect to HARQ retransmissions. Based on the per MBS or per UE basis service configuration, the UE may employ one of the relevant approaches (as described earlier) for the respective service or services.

In an embodiment, the UE may utilize at least one of the approaches and/or a possible combination of the approaches as described earlier. Further, the configuration parameters may vary across the PTM (including PTM1 and/or PTM2) and PTP modes e.g. Max-ReTx count, configuration or support/no support for RTT and/or ReTx timers, RTT timers' duration, ReTx timers' duration, HARQ feedback modes, HARQ retransmission support or no support.

In an embodiment, the UE may perform reception for PTP based initial HARQ transmission and/or PTP based HARQ retransmission irrespective of the wake-up signal (WUS) status. That is, even when the WUS indicates no PDCCH allocation in the next DRX cycle, the PTP mode operation for MBS reception may be unaffected and may be performed.

In an embodiment, the UE may not perform reception for PTP based initial HARQ transmission and/or PTP based HARQ retransmission when the WUS indicates no PDCCH allocation in the next DRX cycle.

In an embodiment, the PTP may be addressed by C-RNTI/CS-RNTI and the PTP based initial HARQ transmission and/or the PTP based HARQ retransmission may be unaffected and received normally, even when the WUS indicates no PDCCH allocation in the next DRX cycle.

In an embodiment, for the MBS split bearer, the PTM RLC bearer/leg can be subject to activation and/or deactivation by the command received by the network. Therefore, the UE may perform at least one of the following operations, when it receives a deactivation of the PTM RLC bearer/leg:

>if the UE was having PTM based initial HARQ transmission and retransmission configuration; or >if the UE was having PTM based initial HARQ transmission and PTP based retransmission configuration UE switches to the PTP based initial HARQ transmission and/or retransmission; and/or UE suspends or relinquishes the PTM based initial HARQ transmission and/or retransmission configuration; and/or UE stops and does not utilize the drx-HARQ-RTT-TimerMBS and/or drx-RetransmissionTimerMBS timers; and/or The HARQ buffer(s) and/or process(es) are used only by the PTP.

The UE may perform at least one of the following operations, when it receives an activation of the PTM RLC bearer/leg >if the UE was having PTM based initial HARQ transmission and retransmission configuration before deactivation; or >if the UE was having PTM based initial HARQ transmission and PTP based retransmission configuration before deactivation The UE switches to the PTM based initial HARQ transmission and/or retransmission; and/or The UE starts utilizing drx-HARQ-RTT-TimerMBS and/or drx-RetransmissionTimerMBS timers; and/or The HARQ buffer(s) and/or process(es) are used by PTM; and/or The UE switches to the PTM based initial HARQ transmission and/or PTP based retransmission; and/or The HARQ buffer(s) and/or process(es) are shared by PTM and PTP.

In an embodiment, for the MBS split bearer, when the PTM RLC bearer/leg is activated or deactivated, network may provide the new configuration for the HARQ initial transmission and/or retransmission in the dedicated signaling (e.g. RRC reconfiguration, MAC signaling). The configuration may include at least one of the HARQ feedback mode, RTT timer, ReTx timer and other DRX timers' configuration and so on. Alternatively, the network may provide the UE with a switching back indication to PTM configuration (e.g. if activated) or PTP configuration (e.g. if deactivated) in the dedicated signaling (e.g. RRC reconfiguration, MAC signaling) and the UE can switch back to the earlier or indicated configuration.

In an embodiment, when the PTM RLC bearer is deactivated, the corresponding HARQ buffer(s) and/or process(es) may be cleared/flushed if the PTM RLC bearer does not share HARQ buffers/processes with the PTP RLC bearer and/or if the PTM RLC bearer is not configured or expected for PTP based retransmission.

In an embodiment, when the PTM RLC bearer is deactivated, the corresponding HARQ buffer(s) and/or process(es) may be cleared/flushed.

In an embodiment, the UE may undertake the process of clearing/flushing/initialization of the HARQ buffer(s) and/or process(es) for at least one of the following conditions:

When a new data assignment is received by the UE (e.g. a NDI indicating a new data reception);

When an activation command is received, by the UE, for the PTM RLC bearer/leg;

When a deactivation command is received by the UE for the PTM RLC bearer/leg;

When there is a bearer mode change (e.g. MBS split bearer mode to PTM mode or PTP mode, or vice-versa);

When the MBS service/session is started or ended;

When there is handover and/or cell reselection;

When there is switching between the PTM, the PTP and the PTM+PTP delivery modes configured or notified by network;

When there is a dedicated signaling and/or group notification (e.g. unicast paging, group paging, multicast control channel (MCCH) change notification, MCCH) is received by the UE, and the MBS session is configured or activated or deactivated or released;

When there is a break in service/coverage (e.g. MUSIM gap, coverage loss, measurement gap, rejoining, capability limitation, BWP change etc.);

When the retransmission count equals or exceeds the max Retransmission (i.e. MaxReTx Count);

When receiving a configuration and/or reconfiguration and/or modification with at least one parameter configuration for the DRX and/or HARQ timers or parameters or HARQ feedback mode or HARQ retransmission configuration, max ReTx count etc.;

When there is a RRC state change (e.g. between RRC_IDLE, RRC_INACTIVE and RRC_CONNECTED);

When there is a group notification for multicast session activation, deactivation, start, stop, release, or configuration change indication; and When the WUS indicates no PDCCH allocation for the next DRX cycle and there still remains data in the DL HARQ buffer that is to be successfully decoded.

In an embodiment, feed-backless HARQ retransmission may be applied for MCCH transmission. Further, the DRX and/or HARQ timers' configurations (e.g. RTT timer and/or ReTx timers etc.) and different approaches as described in the embodiments disclosed herein can be utilized for MCCH.

In an embodiment, no HARQ retransmission may be applied for MCCH transmission.

In an embodiment, when the DRX is configured, the active time for the serving cells in a DRX group can include the time while:

- the drx-onDurationTimer timer or the drx-InactivityTimer timer configured for the DRX group is running, or
- the drx-RetransmissionTimerDL timer or the drx-RetransmissionTimerUL timer is running on any serving cell in the DRX group; or
- the drx-RetransmissionTimerDL timer is running for the PTP mode MBS reception (e.g. PDCCH addressed by the C-RNTI or the CS-RNTI) on any serving cell; or
- the drx-RetransmissionTimerMBS timer is running for the PTM mode MBS reception (e.g. multicast or delivery mode 1) on any serving cell; or
- the ra-ContentionResolutionTimer timer or the msgB-ResponseWindow is running; or
- a Scheduling Request is sent on the PUCCH and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble.

In an embodiment, the HARQ buffer(s) and process(es) and process identity (HPI) may be shared across PTM and PTP reception for the following configuration:

- PTM based initial HARQ transmission and PTP based HARQ retransmission

In an embodiment, a logical channel identity of a received MBS packet may be used to distinguish between the PTM reception, the PTP reception, and the unicast reception.

In an embodiment, HARQ buffer(s) and process(es) and process identity (HPI) used may be configured differently based on the HARQ retransmission modes as below and may not be shared across these different transmission modes:

- PTM based initial HARQ transmission and PTM based HARQ retransmission
- PTM based initial HARQ transmission and PTP based HARQ retransmission
- PTP based initial HARQ transmission and PTP based HARQ retransmission In an embodiment, when the HARQ buffer(s) and process(es) and process identity (HPI) are shared across the PTM and the PTP reception for the configuration of "PTM based initial HARQ transmission and PTP based HARQ retransmission," the configuration of the HARQ retransmission, the HARQ feedback mode and the HARQ RTT and ReTx timers, MaxReTx count etc. may be provided along with the configuration for the PTM bearer.

Referring now to the drawings, and more particularly to FIGS. 1 through 15 where similar reference characters denote corresponding features consistently throughout the figures, there are shown example embodiments.

FIGS. 1*a*, 1*b*, 1*c*, and 1*d* illustrate a method 100 for managing the RTT timer after feedback transmission, according to embodiments as disclosed herein.

At step 102, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 104, the UE 10 may determine at least one of the following:

a. If the HARQ feedback is configured;

b. If the HARQ feedback is enabled or is not disabled;

c. If the HARQ feedback is allowed for transmission; and d. If the HARQ feedback is actually transmitted.

At step 106, the PDCCH may indicate the DL multicast transmission for the G-RNTI or the G-CS-RNTI and the HARQ feedback is at least one of: enabled, configured, allowed for transmission, transmitted, or not disabled.

At step 108, the MAC entity 20 may start a drx-HARQ-RTT-TimerDL timer for a corresponding HARQ process in the first symbol after the end of a corresponding transmission carrying a DL HARQ feedback after the PTM transmission and if a PTP retransmission is configured or expected, and may stop a drx-RetransmissionTimerDL timer for the corresponding HARQ process.

At step 110, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 112, the MAC entity 20 may start a drx-HARQ-RTT-TimerMBS timer for the corresponding HARQ process in the first symbol after the end of the corresponding transmission carrying the DL HARQ feedback after the PTM transmission and if a PTM retransmission is configured or expected, and the MAC entity 20 may stop a drx-RetransmissionTimerMBS timer for the corresponding HARQ process.

At step 114, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 116, the MAC entity 20 may start the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and if the PTM retransmission are configured or expected, and the MAC entity 20 may stop the drx-RetransmissionTimerDL timer and the drx-RetransmissionTimerMBS timer for the corresponding HARQ process.

At step 118, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 120, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may only perform one of the following combinations:

a. a combination of step 108 and step 110;

b. a combination of step 112 and step 114; or c. a combination of step 116, step 118, and step 120.

FIGS. 2*a*, 2*b*, 2*c*, and 2*d* illustrate a method 200 for managing HARQ retransmission when multicast DRX for the G-RNTI or the G-CS-RNTI are configured, according to embodiments as disclosed herein.

At step 202, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 204, the UE 10 may determine at least one of the following:

a. If the HARQ feedback is configured;

b. If the HARQ feedback is enabled or is not disabled;

c. If the HARQ feedback is allowed for transmission; and d. If the HARQ feedback is actually transmitted At step 206, the following may occur:

a. Configuration of multicast DRX for the G-RNTI or the G-CS-RNTI;

b. The MAC PDU is received in the configure DL multicast assignment; and c. The HARQ feedback is at least one of: enabled, configured, allowed for transmission, transmitted, or not disabled.

At step 208, the MAC entity 20 may start a drx-HARQ-RTT-TimerDL timer for a corresponding HARQ process in the first symbol after the end of the corresponding transmission carrying a DL HARQ feedback after the PTM transmission and if a PTP retransmission is configured or expected, and may stop a drx-RetransmissionTimerDL timer for the corresponding HARQ process.

At step 210, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 212, the MAC entity 20 may start a drx-HARQ-RTT-TimerMBS timer for the corresponding HARQ process in the first symbol after the end of the corresponding transmission carrying the DL HARQ feedback after the PTM transmission and if a PTM retransmission is configured or expected, and the MAC entity 20 may stop a drx-RetransmissionTimerMBS timer for the corresponding HARQ process.

At step 214, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 216, the MAC entity 20 may start the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and if the PTM retransmission are configured or expected, and the MAC entity 20 may stop the drx-RetransmissionTimerDL timer and the drx-RetransmissionTimerMBS timer for the corresponding HARQ process.

At step 218, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 220, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may only perform one of the following combinations:

a. a combination of step 208 and step 210;

b. a combination of step 212 and step 214; or c. a combination of step 216, step 218, and step 220.

The UE 10 may perform at least one of the following:

a. configuring or expecting to receive a PTP retransmission after a PTM transmission;

b. configuring or expecting to receive a PTM retransmission after the PTM transmission;

c. configuring or expecting to receive the PTP retransmission and the PTM retransmission after the PTM transmission; and d. configuring or expecting to receive the PTP retransmission after a PTP transmission.

If the MAC entity 20 is in active time for the G-RNTI or the G-CS-RNTI, then the PDCCH is monitored for the G-RNTI or the G-CS-RNTI.

FIGS. 3*a*, 3*b*, 3*c*, and 3*d* illustrate a method 300 for managing HARQ transmission when a HARQ feedback is at least one of not configured, not enabled, or is disabled, according to embodiments as disclosed herein.

At step 302, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 304, at least one of the following may occur:

a. The HARQ feedback is not configured; and b. The HARQ feedback is not enabled or is disabled.

A plurality of DRX HARQ RTT timers may not be started at step 304. At step 306, the MAC entity 20 may start a first HARQ RTT timer (drx-HARQ-RTT-TimerDL timer) for a corresponding HARQ process in the first symbol after the end of a supposed corresponding transmission carrying the DL HARQ feedback after a PTM transmission and if a PTP retransmission is expected or configured, and may stop a drx-RetransmissionTimerDL timer for the corresponding HARQ process.

At step 308, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 310, the MAC entity 20 may start a second HARQ RTT timer (drx-HARQ-RTT-TimerMBS timer) for the corresponding HARQ process in the first symbol after the end of the supposed corresponding transmission carrying the DL HARQ feedback after the PTM transmission and if a PTM retransmission is expected or configured, and may stop a drx-RetransmissionTimerMBS timer for the corresponding HARQ process.

At step 312, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 314, the MAC entity 20 may start the drx-HARQ-RTT-TimerDL timer and the drx-HARQ-RTT-TimerMBS timer in the first symbol after the end of the supposed corresponding transmission carrying the DL HARQ feedback after the PTM transmission and if the PTP retransmission and the PTM retransmission are expected or configured, and may stop the drx-RetransmissionTimerDL timer and the drx-RetransmissionTimerMBS timer for the corresponding HARQ process.

At step 316, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 318, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may only perform one of the following combinations:

a. a combination of step 306 and step 308;

b. a combination of step 310 and step 312; or c. a combination of step 314, step 316, and step 318.

FIGS. 4*a*, 4*b*, 4*c*, and 4*d* illustrate a method 400 for managing a first and second RTT timer, according to embodiments as disclosed herein.

At step 402, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 404, at least one of the following may occur:

a. The HARQ feedback is not configured; and b. The HARQ feedback is not enabled or is disabled.

At step 406, the MAC entity 20 may start a first HARQ RTT timer (drx-HARQ-RTT-TimerDL timer) for a corresponding HARQ process after a PTM transmission and if a PTP retransmission is configured or expected, and may stop a drx-RetransmissionTimerDL timer for the corresponding HARQ process.

At step 408, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 410, the MAC entity 20 may start a second HARQ RTT timer (drx-HARQ-RTT-TimerMBS timer) for the corresponding HARQ process after the PTM transmission and if a PTM retransmission is configured or expected, and may stop a drx-RetransmissionTimerMBS timer for the corresponding HARQ process.

At step 412, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 414, the MAC entity 20 may start the drx-HARQ-RTT-TimerDL timer and the drx-HARQ-RTT-TimerMBS timer for the corresponding HARQ process after the PTM transmission and if the PTP retransmission and the PTM retransmission are configured or expected, and may stop the drx-RetransmissionTimerDL timer and the drx-RetransmissionTimerMBS timer for the corresponding HARQ process.

At step 416, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 418, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may only perform one of the following combinations:

a. a combination of step 406 and step 408;

b. a combination of step 410 and step 412; or c. a combination of step 414, step 416, and step 418.

FIGS. 5*a*, 5*b*, 5*c*, and 5*d* illustrate a method for managing a third RTT timer, according to embodiments as disclosed herein.

At step 502, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 504, at least one of the following may occur:

a. The HARQ feedback is not configured; and b. The HARQ feedback is not enabled or is disabled.

At step 506, the MAC entity 20 may start a third HARQ RTT timer (drx-HARQ-RTT-TimerDL2 timer) for a corresponding HARQ process after a PTM transmission and if a PTP retransmission is configured or expected, and may stop a drx-RetransmissionTimerDL timer for the corresponding HARQ process.

At step 508, the MAC entity 20 may start the drx-RetransmissionTimerDL timer for the corresponding HARQ process in the first symbol after the expiry of the drx-HARQ-RTT-TimerDL2 timer if there is an unsuccessful decoding of the data of the corresponding HARQ process.

At step 510, the MAC entity 20 may start a second HARQ RTT timer (drx-HARQ-RTT-TimerMBS timer) for the corresponding HARQ process after the PTM transmission and if a PTM retransmission is configured or expected, and may stop a drx-RetransmissionTimerMBS timer for the corresponding HARQ process.

At step 512, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 514, the MAC entity 20 may start the drx-HARQ-RTT-TimerDL2 timer and the drx-HARQ-RTT-TimeMBS timer for the corresponding HARQ process after the PTM transmission and if the PTP retransmission and the PTM retransmission are configured or expected, and may stop the drx-RetransmissionTimerDL timer and the drx-RetransmissionTimerMBS timer for the corresponding HARQ process.

At step 516, the MAC entity 20 may start the drx-RetransmissionTimerDL timer for the corresponding HARQ process in the first symbol after the expiry of the drx-HARQ-RTT-TimerDL2 timer if there is an unsuccessful decoding of the data of the corresponding HARQ process.

At step 518, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may only perform one of the following combinations:

a. a combination of step 506 and step 508;

b. a combination of step 510 and step 512; or c. a combination of step 514, step 516, and step 518.

FIG. 6 illustrates a method 600 for starting the ReTx timer after the supposed timing of the feedback transmission, according to embodiments as disclosed herein.

At step 602, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 604, at least one of the following may occur:

a. The HARQ feedback is not configured; and b. The HARQ feedback is not enabled or is disabled.

At step 606, the MAC entity 20 may stop a drx-RetransmissionTimerDL timer for a corresponding HARQ process after a PTM transmission and if a PTP retransmission is configured or expected, and may start the drx-RetransmissionTimerDL timer for the corresponding HARQ process in the first symbol after the end of a supposed corresponding transmission carrying the DL HARQ feedback.

At step 608, the MAC entity 20 may stop a drx-RetransmissionTimerMBS timer for the corresponding HARQ process after the PTM transmission and if a PTM retransmission is configured or expected, and may start the drx-RetransmissionTimerMBS timer for the corresponding HARQ process in the first symbol after the end of the supposed corresponding transmission carrying the DL HARQ feedback.

At step 610, the MAC entity 20 may stop the drx-RetransmissionTimerDL timer and the drx-RetransmissionTimerMBS timer for the corresponding HARQ process after the PTM transmission and if the PTP retransmission and the PTM retransmission are configured or expected, and may start the drx-RetransmissionTimerDL timer and the drx-RetransmissionTimerMBS timer for the corresponding HARQ process in the first symbol after the end of the supposed corresponding transmission carrying the DL HARQ feedback.

The MAC entity 20 may perform only one of the following: step 606, step 608, or step 610.

FIG. 7 illustrates a method 700 for managing the ReTx timer after receiving an assignment, according to embodiments as disclosed herein.

At step 702, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 704, at least one of the following may occur:

a. The HARQ feedback is not configured; and b. The HARQ feedback is not enabled or is disabled.

At step 706, the MAC entity 20 may start a drx-RetransmissionTimerDL timer for a corresponding HARQ process after a PTM transmission and if a PTP retransmission is expected or configured.

At step 708, the MAC entity 20 may start a drx-RetransmissionTimerMBS timer for the corresponding HARQ process after the PTM transmission and if a PTM retransmission is expected or configured.

At step 710, the MAC entity 20 may start the drx-RetransmissionTimerDL timer and the drx-RetransmissionTimerMBS timer for the corresponding HARQ process after the PTM transmission and if the PTP retransmission and the PTM retransmission are expected or configured.

The MAC entity 20 may perform only one of the following: step 706, step 708, and step 710.

FIGS. 8*a*, 8*b*, 8*c*, and 8*d* illustrate a method 800 for starting a RTT timer when at least one of the following occurs: an unsuccessful decoding of the data of the corresponding HARQ process, and feedback for the corresponding HARQ process is not ACK, according to embodiments as disclosed herein.

At step 802, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 802, at least one of the following may occur:

a. An unsuccessful decoding of the data of the corresponding HARQ process; and b. Feedback for the corresponding HARQ process is not ACK.

At step 806, the HARQ feedback is at least one of: configured, enabled, not disabled, allowed for transmission, or transmitted.

The MAC entity 20 may skip to start any DRX HARQ RTT timers if there is no HARQ feedback transmission because of ACK in case of NACK only HARQ feedback configuration.

At step 808, the MAC entity 20 may start a drx-HARQ-RTT-TimerDL timer for a corresponding HARQ process in the first symbol after the end of a corresponding transmission carrying the DL HARQ feedback after a PTM transmission and if a PTP retransmission is configured or expected, and may stop a drx-RetransmissionTimerDL timer for the corresponding HARQ process.

At step 810, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process.

At step 812, the MAC entity 20 may start a drx-HARQ-RTT-TimerMBS timer for the corresponding HARQ process in the first symbol after the end of the corresponding transmission carrying the DL HARQ feedback after the PTM transmission and if a PTM retransmission is configured or expected, and may stop a drx-RetransmissionTimerMBS timer for the corresponding HARQ process.

At step 814, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

At step 816, the MAC entity 20 may start the drx-HARQ-RTT-TimerDL timer and the drx-HARQ-RTT-TimerMBS timer for the corresponding HARQ process in the first symbol after the end of the corresponding transmission carrying the DL HARQ feedback after the PTM transmission and if the PTP retransmission and the PTM retransmission are configured or expected, and may stop the drx-RetransmissionTimerDL timer and the drx-RetransmissionTimerMBS timer for the corresponding HARQ process.

At step 818, the MAC entity 20 may start the drx-RetransmissionTimerDL timer for the corresponding HARQ process in the first symbol after the expiry of the drx-HARQ-RTT-TimerDL timer if there is an unsuccessful decoding of the data of the corresponding HARQ process/At step 820, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

The MAC entity 20 may perform only one of the following combinations:

a. A combination of step 808 and step 810;

b. A combination of step 812 and step 814; or c. A combination of step 816, step 818, and step 820.

FIG. 9 illustrates a method 900 for managing HARQ retransmission in a wireless communication network when it is supported for broadcast services, according to embodiments as disclosed herein.

At step 902, the UE 10 may receive a PDCCH that indicates a DL transmission for a G-RNTI or a G-CS RNTI.

At step 904, the UE 10 may determine at least one of the following:

a. If a HARQ feedback is not configured; and b. If the feedback-less HARQ retransmission is configured or is applied.

A plurality of DRX HARQ RTT and DRX ReTx may not be configured

At step 906, the MAC entity 20 may start a drx-HARQ-RTT-TimerMBS timer for a corresponding HARQ process after a PTM transmission and if a PTM retransmission is expected or configured.

At step 908, the MAC entity 20 may stop a drx-RetransmissionTimerMBS timer for the corresponding HARQ process.

At step 910, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

FIG. 10 illustrates a method 1000 for managing HARQ retransmission in a wireless communication network when it is supported for broadcast services when the PDCCH indicates DL transmission for the G-RNTI or the G-CS-RNTI, according to embodiments as disclosed herein.

At step 1002, the UE 10 may receive a PDCCH that indicates a DL transmission for a G-RNTI or a G-CS RNTI.

At step 1004, the UE 10 may determine at least one of the following:

a. If a HARQ feedback is not configured; and b. If the feedback-less HARQ retransmission is configured or is applied.

At step 1006, the PDCCH may indicate the DL transmission for the G-RNTI or the G-CS-RNTI.

At step 1008, the MAC entity 20 may start a drx-HARQ_RTT-TimerMBS timer for a corresponding HARQ process in the first symbol after the end of a supposed corresponding transmission carrying a DL HARQ feedback after a PTM transmission and if a PTM retransmission is expected or configured.

At step 1010, the MAC entity 20 may stop a drx-RetransmissionTimerMBS timer for the corresponding HARQ process.

At step 1012, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If the drx-HARQ-RTT-TimerMBS timer is not configured, the drx-RetransmissionTimerMBS timer for the corresponding HARQ process may be started after a PTM transmission and if a PTM retransmission is expected or configured.

FIG. 11 illustrates a method 1100 for managing HARQ retransmission when the PDCCH indicates the DL transmission for the G-RNTI or the G-CS-RNTI and the RTT timer is not configured, according to embodiments as disclosed herein.

At step 1102, the UE 10 may receive a PDCCH that indicates a DL transmission for a G-RNTI or a G-CS RNTI.

At step 1104, the UE 10 may determine at least one of the following:

a. If a HARQ feedback is not configured; and b. If the feedback-less HARQ retransmission is configured or is applied.

At step 1106, the PDCCH may indicate the DL transmission for the G-RNTI or the G-CS-RNTI, wherein the drx-HARQ-RTT-TimerMBS timer may not be configured, and wherein there is a PTM transmission and a PTM retransmission may be expected or configured.

At step 1108, the MAC entity 20 may stop a drx-RetransmissionTimerMBS timer for a corresponding HARQ process.

At step 1110, the MAC entity 20 may start the drx-RetransmissionTimerMBS timer for the corresponding HARQ process in the first symbol after the end of a supposed corresponding transmission carrying a DL HARQ feedback.

FIG. 12 illustrates a method 1200 for managing multicast service reception in one of a RRC idle state, a RRC inactive state, or a combination of the RRC idle state and the RRC inactive state, according to embodiments as disclosed herein.

At step 1202, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 1204, the UE 10 may determine at least one of the following:

a. If a HARQ feedback is not configured; and b. If the feedback-less HARQ retransmission is configured or is applied.

For the RRC inactive state, a plurality of DRX HARQ RTT and DRX ReTx timers may not be configured. Upon a change in the RRC state for the multicast service reception, the UE may be provided, through dedicated signaling, with the configuration for at least one of the following:

a. A plurality of DRX timers; and b. A HARQ feedback mode or transmission approach.

At step 1206, the MAC entity 20 may start a drx-HARQ-RTT-TimerMBS timer for a corresponding HARQ process after a PTM transmission and if a PTM retransmission is expected or configured.

At step 1208, the MAC entity 20 may stop a drx-RetransmissionTimerMBS timer for the corresponding HARQ process.

At step 1210, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

FIG. 13 illustrates a method 1300 for managing multicast service reception in the RRC_IDLE and/or RRC_INACTIVE state when the PDCCH indicates the DL multicast transmission for the G-RNTI or the G-CS-RNTI, according to embodiments as disclosed herein.

At step 1302, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 1304, the UE 10 may determine at least one of the following:

a. If a HARQ feedback is not configured; and b. If the feedback-less HARQ retransmission is configured or is applied.

At step 1306, the PDCCH may indicate the DL multicast transmission for the G-RNTI or the G-CS-RNTI.

At step 1308, the MAC entity 20 may start a drx-HARQ-RTT-TimerMBS timer for a corresponding HARQ process in the first symbol after the end of a supposed corresponding transmission carrying a DL HARQ feedback after a PTM transmission and if a PTM retransmission is configured or expected.

At step 1310, the MAC entity 20 may stop a drx-RetransmissionTimerMBS timer for the corresponding HARQ process.

At step 1312, the MAC entity 20 may start the drx-RetransmissionTimerMBS timer for the corresponding HARQ process in the first symbol after the expiry of the drx-HARQ-RTT-TimerMBS timer if there is an unsuccessful decoding of the data of the corresponding HARQ process.

If the drx-HARQ-RTT-TimerMBS timer is not configured, then the drx-RetransmissionTimerMBS timer for the corresponding HARQ process may be started after a PTM transmission and if a PTM retransmission is expected or configured.

FIG. 14 illustrates a method 1400 for managing multicast service reception in the RRC_IDLE and/or RRC_INACTIVE state when the PDCCH indicates the DL transmission for the G-RNTI or the G-CS-RNTI and the RTT timer is not configured, according to embodiments as disclosed herein.

At step 1402, the UE 10 may receive at least one of the following:

a. A PDCCH that indicates a DL multicast transmission for a G-RNTI or a G-CS-RNTI or a C-RNTI or a CS-RNTI; and b. A configured DL multicast assignment for the G-RNTI or the G-CS-RNTI, wherein a MAC PDU is received in the configured DL assignment.

At step 1404, the UE 10 may determine at least one of the following:

a. If a HARQ feedback is not configured; and b. If the feedback-less HARQ retransmission is configured or is applied.

At step 1406, the PDCCH may indicate the DL transmission for the G-RNTI or the G-CS-RNTI, wherein the drx-HARQ-RTT-TimerMBS timer is not configured, and wherein there is a PTM transmission and a PTM retransmission may be expected or reconfigured.

At step 1408, the MAC entity 20 may stop a drx-RetransmissionTimerMBS timer for a corresponding HARQ process.

At step 1410, the MAC entity 20 may start the drx-RetransmissionTimerMBS timer for the corresponding HARQ process in the first symbol after the end of a supposed corresponding transmission carrying a DL HARQ feedback.

The various actions in methods 100, 200, 300, 400, 500, 600, 700, 800, 900, 1000, 1100, 1200, 1300, and 1400 may be performed in the order presented, in a different order or simultaneously. Further, in some embodiments, some actions listed in FIGS. 1 to 14 may be omitted.

FIG. 15 Illustrates a system 1500 for enabling HARQ retransmission for NR MBS. The system 1500 can comprise a UE 10, which can further comprise a memory, a processor, one or more MAC entities 20, and a DRX module.

The UE 10 may be configured to initialize, clear, or flush one or more HARQ buffers when one or more events occur. The UE 10 may be configured to receive PTP transmission and/or PTP retransmission, irrespective of a WUS status. The UE 10 may be configured to receive PTM transmission and/or PTM retransmission, even if the WUS status indicates that no PDCCH has been allocated in the next DRX cycle. The UE 10 may be configured to receive the configuration of the plurality of DRX timers and the plurality of HARQ RTT and ReTx timers. A set of instructions may be stored in the memory of the UE 10, that when executed by the processor, result in the performance of the actions described herein.

The DRX module can comprise a DRX controller and a plurality of DRX timers. Examples of the DRX timers can include HARQ RTT timers and ReTx timers.

The MAC entity 20 may be configured to start or stop the plurality of DRX timers.

The embodiments disclosed herein can be implemented through at least one software program running on at least one hardware device and performing network management functions to control the elements. The elements shown in FIG. 15 can be at least one of a hardware device, or a combination of hardware device and software module.

The embodiments disclosed herein describe methods and systems of HARQ retransmission for NR MBS services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method performed by a user equipment (UE) in a wireless communication system, the method comprising:

receiving, from a base station, a medium access control (MAC) protocol data unit (PDU) in a configured downlink multicast assignment; and when a hybrid automatic repeat request (HARQ) feedback is enabled, starting a first HARQ round trip time (RTT) timer associated with a point to multipoint (PTM) for a corresponding first HARQ process and starting a second HARQ RTT timer for the corresponding first HARQ process based on a configured scheduling-radio network temporary identifier (CS-RNTI) being configured, wherein the first HARQ RTT timer and the second HARQ RTT timer start in a first symbol after an end of a corresponding transmission carrying a first HARQ feedback.

2. The method of claim 1, further comprising:

when the HARQ feedback is disabled, starting the first HARQ RTT timer associated with the PTM for a corresponding second HARQ process in a first symbol after an end of the corresponding transmission carrying a second HARQ feedback that would be performed if the HARQ feedback were enabled.

3. The method of claim 1, further comprising:

when the first HARQ RTT timer associated with the PTM expires and data for a corresponding HARQ process was not successfully decoded, starting a discontinuous reception (DRX) retransmission timer associated with the PTM for the corresponding HARQ process in a first symbol after an expiry of the first HARQ RTT timer associated with the PTM.

4. The method of claim 1, wherein a multicast DRX is configured for a group-radio network temporary identifier (G-RNTI) or a group-configured scheduling-radio network temporary identifier (G-CS-RNTI).

5. The method of claim 1, wherein a multicast DRX is configured for a multicast in a radio resource control (RRC) inactive state.

6. A method performed by a base station in a wireless communication system, the method comprising:

transmitting, to a user equipment (UE), a medium access control (MAC) protocol data unit (PDU) in a configured downlink multicast assignment, wherein when a hybrid automatic repeat request (HARQ) feedback is enabled, a first HARQ round trip time (RTT) timer associated with a point to multipoint (PTM) for a corresponding first HARQ process starts and a second HARQ RTT timer for the corresponding first HARQ process starts based on a configured scheduling-radio network temporary identifier (CS-RNTI) being configured, and wherein the first HARQ RTT timer and the second HARQ RTT timer start in a first symbol after an end of a corresponding transmission carrying a first HARQ feedback.

7. The method of claim 6, when the HARQ feedback is disabled, the first HARQ RTT timer associated with the PTM for a corresponding second HARQ process starts in a first symbol after an end of a corresponding transmission carrying a second HARQ feedback that would be performed if the HARQ feedback were enabled.

8. The method of claim 6, when the first HARQ RTT timer associated with the PTM expires and data for a corresponding HARQ process was not successfully decoded, a discontinuous reception (DRX) retransmission timer associated with the PTM for the corresponding HARQ process starts in a first symbol after an expiry of the first HARQ RTT timer associated with the PTM.

9. The method of claim 6, wherein a multicast DRX is configured for a group-radio network temporary identifier (G-RNTI) or a group-configured scheduling-radio network temporary identifier (G-CS-RNTI).

10. The method of claim 6, wherein a multicast DRX is configured for a multicast in a radio resource control (RRC) inactive state.

11. A user equipment (UE) in a wireless communication system, the UE comprising:

a transceiver, and a controller coupled with the transceiver, and configured to:

receive, from a base station, a medium access control (MAC) protocol data unit (PDU) in a configured downlink multicast assignment, and when a hybrid automatic repeat request (HARQ) feedback is enabled, start a first HARQ round trip time (RTT) timer associated with a point to multipoint (PTM) for a corresponding first HARQ process and start a second HARQ RTT timer for the corresponding first HARQ process based on a configured scheduling-radio network temporary identifier (CS-RNTI) being configured, wherein the first HARQ RTT timer and the second HARQ RTT timer start in a first symbol after an end of a corresponding transmission carrying a first HARQ feedback.

12. The UE of claim 11, wherein the controller is further configured to:

when the HARQ feedback is disabled, start the first HARQ RTT timer associated with the PTM for a corresponding second HARQ process in a first symbol after an end of a corresponding transmission carrying a second HARQ feedback that would be performed if the HARQ feedback were enabled.

13. The UE of claim 11, wherein the controller is further configured to:

when the first HARQ RTT timer associated with the PTM expires and data for a corresponding HARQ process was not successfully decoded, start a discontinuous reception (DRX) retransmission timer associated with the PTM for the corresponding HARQ process in a first symbol after an expiry of the first HARQ RTT timer associated with the PTM.

14. The UE of claim 11, wherein a multicast DRX is configured for a group-radio network temporary identifier (G-RNTI) or a group-configured scheduling-radio network temporary identifier (G-CS-RNTI).

15. The UE of claim 11, wherein a multicast DRX is configured for a multicast in a radio resource control (RRC) inactive state.

16. A base station in a wireless communication system, the base station comprising:

a transceiver, and a controller coupled with the transceiver, and configured to:

transmit, to a user equipment (UE), a medium access control (MAC) protocol data unit (PDU) in a configured downlink multicast assignment, wherein when a hybrid automatic repeat request (HARQ) feedback is enabled, a first HARQ round trip time (RTT) timer associated with a point to multipoint (PTM) for a corresponding first HARQ process starts and a second HARQ RTT timer for the corresponding first HARQ process starts based on a configured scheduling-radio network temporary identifier (CS-RNTI) being configured, and wherein the first HARQ RTT timer and the second HARQ RTT timer start in a first symbol after an end of a corresponding transmission carrying a first HARQ feedback.

17. The base station of claim 16, when the HARQ feedback is disabled, the first HARQ RTT timer associated with the PTM for a corresponding second HARQ process starts in a first symbol after an end of a corresponding transmission carrying a second HARQ feedback that would be performed if the HARQ feedback were enabled.

18. The base station of claim 16, when the first HARQ RTT timer associated with the PTM expires and data for a corresponding HARQ process was not successfully decoded, a discontinuous reception (DRX) retransmission timer associated with the PTM for the corresponding HARQ process starts in a first symbol after an expiry of the first HARQ RTT timer associated with the PTM.

19. The base station of claim 16, wherein a multicast DRX is configured for a group-radio network temporary identifier (G-RNTI) or a group-configured scheduling-radio network temporary identifier (G-CS-RNTI).

20. The base station of claim 16, wherein a multicast DRX is configured for a multicast in a radio resource control (RRC) inactive state.

* * * * *